United States Patent
Pard et al.

(10) Patent No.: US 11,220,310 B2
(45) Date of Patent: Jan. 11, 2022

(54) SNOWMOBILE HAVING A GEARBOX

(71) Applicant: BOMBARDIER RECREATIONAL PRODUCTS INC., Valcourt (CA)

(72) Inventors: Jean-Sebastien Pard, Tingwick (CA); Joel Pitre, Valcourt (CA); Yan Nolet, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 154 days.

(21) Appl. No.: 16/747,118

(22) Filed: Jan. 20, 2020

(65) Prior Publication Data

US 2020/0407018 A1    Dec. 31, 2020

Related U.S. Application Data

(60) Provisional application No. 62/868,502, filed on Jun. 28, 2019.

(51) Int. Cl.
*B62M 27/02*    (2006.01)
*F16H 37/02*    (2006.01)
*B62M 25/04*    (2006.01)

(52) U.S. Cl.
CPC ............ *B62M 27/02* (2013.01); *B62M 25/04* (2013.01); *F16H 37/021* (2013.01); *B62M 2027/025* (2013.01); *B62M 2027/026* (2013.01); *B62M 2027/027* (2013.01); *B62M 2027/028* (2013.01); *F16H 2037/023* (2013.01); *F16H 2037/028* (2013.01); *F16H 2702/00* (2013.01)

(58) Field of Classification Search
CPC ............ B62M 27/02; B62M 2027/026; B62M 2027/027; B62M 2027/028; F16H 37/021; F16H 2037/023; F16H 2037/026; F16H 2037/028; F16H 37/027; F16H 2702/00
See application file for complete search history.

(56) References Cited

U.S. PATENT DOCUMENTS

| | | | |
|---|---|---|---|
| 5,036,802 A | 8/1991 | D'Amours | |
| 9,016,420 B1* | 4/2015 | Gauthier | B62M 27/02 180/190 |
| 2008/0132376 A1* | 6/2008 | Simmons | F16H 3/145 475/298 |
| 2015/0114343 A1* | 4/2015 | Bernier | F02M 35/162 123/337 |

(Continued)

*Primary Examiner* — Anne Marie M Boehler
(74) *Attorney, Agent, or Firm* — BCF LLP

(57) ABSTRACT

A snowmobile has a gearbox having a first shaft, a second shaft, first transmission gears mounted to the first shaft and second transmission gears mounted to the second shaft. A driven gear mounted to the first shaft engages a forward drive gear mounted to a countershaft. In a first configuration: the first shaft is coupled to the countershaft; when rotating, a driveshaft rotates in a same direction as the countershaft; and configurable portions of the countershaft and second shaft are free of gears. In a second configuration: the forward drive gear is in selective free-spin engagement with the countershaft; a reverse drive gear mounted to the configurable portion of the countershaft is in driving engagement with the countershaft; an actuator selectively transmits rotary motion from the countershaft to the gearbox; a reverse driven gear mounted to the configurable portion of the second shaft meshes with the reverse drive gear.

20 Claims, 16 Drawing Sheets

(56) References Cited

U.S. PATENT DOCUMENTS

| | | | |
|---|---|---|---|
| 2016/0090905 A1* | 3/2016 | Kai | B62M 9/06 |
| | | | 123/559.3 |
| 2017/0138449 A1* | 5/2017 | Hamrin | F16H 37/021 |
| 2018/0154985 A1* | 6/2018 | Thompson | F16C 3/02 |
| 2020/0248804 A1* | 8/2020 | Kindl | F16H 63/3433 |
| 2020/0277023 A1* | 9/2020 | Vigen | B62M 9/08 |
| 2020/0408291 A1* | 12/2020 | Pard | B62M 27/02 |
| 2020/0408292 A1* | 12/2020 | Pard | F16H 59/04 |

* cited by examiner

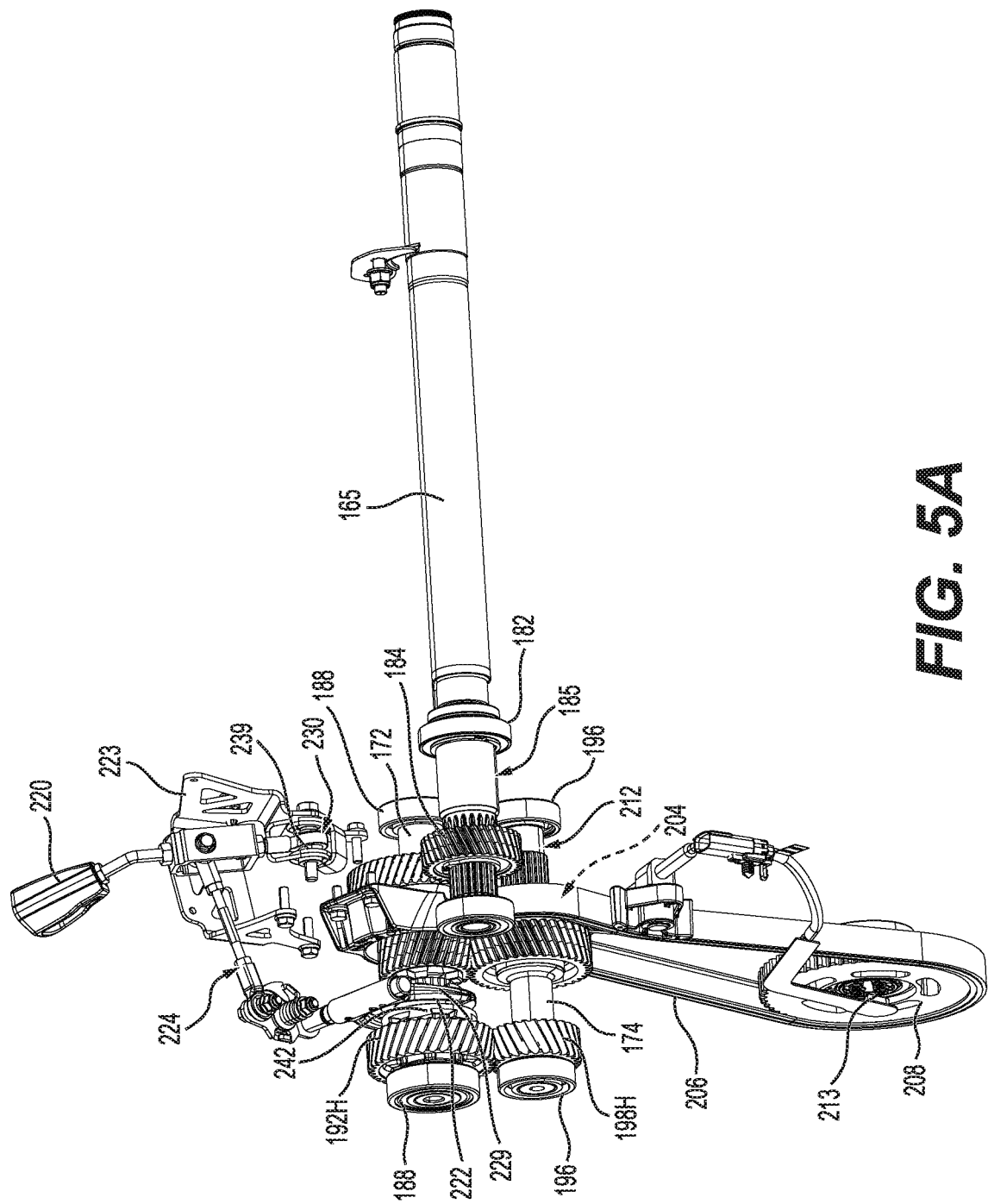

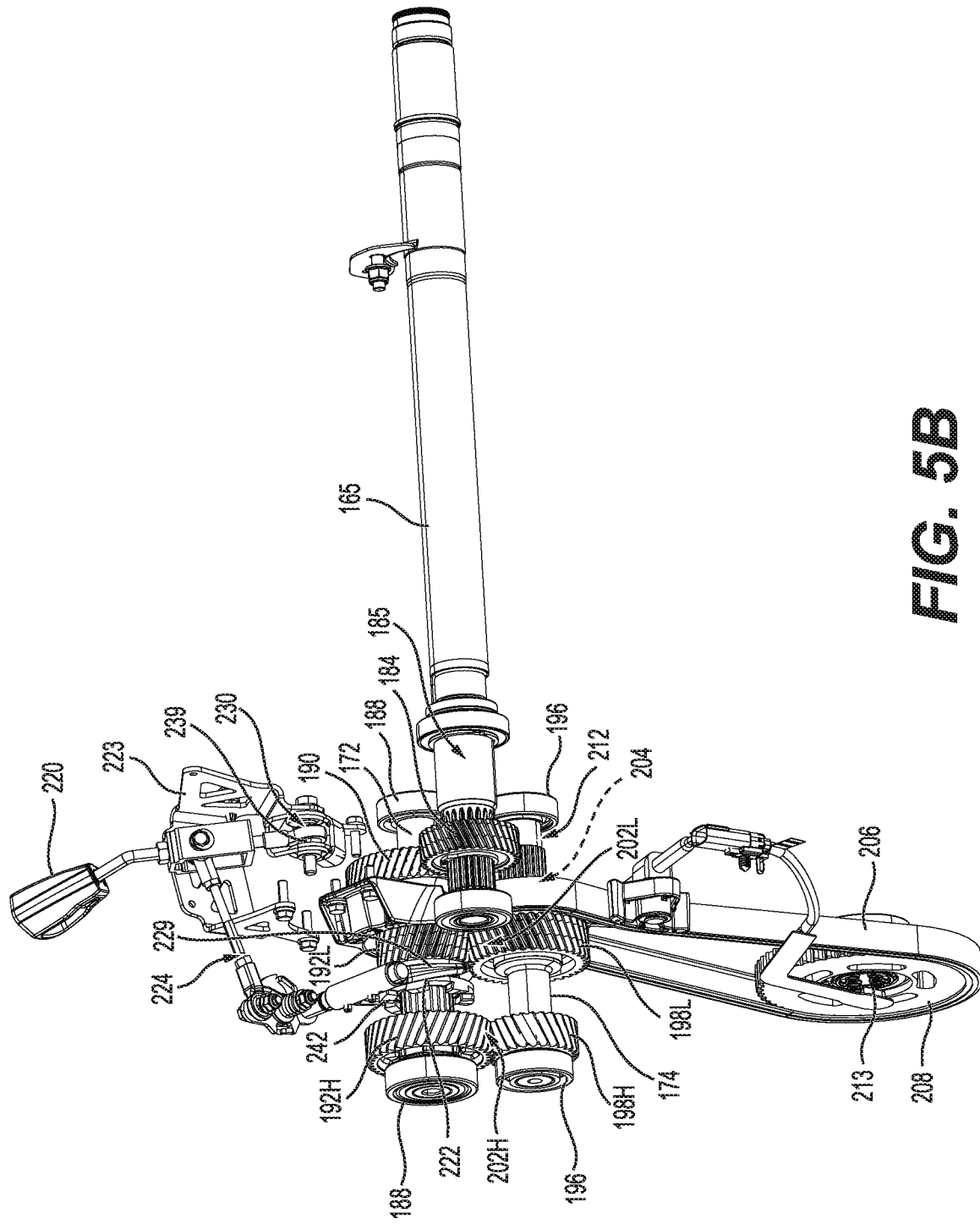

SNOWMOBILE HAVING A GEARBOX

CROSS-REFERENCE

The present application claims priority from U.S. Provisional Patent Application No. 62/868,502, filed on Jun. 28, 2019, the entirety of which is incorporated herein by reference.

TECHNICAL FIELD

The present technology relates to snowmobile transmissions.

BACKGROUND

A snowmobile's engine is operatively connected to a drive track of the snowmobile to propel the snowmobile. Different transmission components are connected between the engine and the drive track to control a speed and torque applied at the drive track. Namely, a continuous variable transmission (CVT) is typically connected to the engine and provides a variable transmission ratio.

However, while transmission components such as the CVT provide control of the speed and torque at the drive track, a greater degree of control of these parameters may be desired by a user of the snowmobile. Moreover, while some snowmobile engines are provided with a reverse function which allows the engine to operate in reverse, other snowmobiles engines may not be provided with such a reverse function and thus the snowmobile could benefit from other ways of operating in reverse.

Therefore, there is a need for a snowmobile that addresses at least some of these drawbacks.

SUMMARY

It is an object of the present technology to ameliorate at least some of the inconveniences present in the prior art.

In accordance with an aspect of the present technology, there is provided a snowmobile. The snowmobile includes: a frame; at least one ski connected to the frame; a rear suspension assembly connected to the frame; a drive track disposed around the rear suspension assembly; an internal combustion engine supported by the frame, the engine having a crankshaft; and a continuously variable transmission (CVT) operatively connected to the crankshaft. The CVT includes a drive pulley operatively connected to the crankshaft; a driven pulley; and a transmission belt interconnecting the drive pulley and the driven pulley. The snowmobile also includes a countershaft connected to the driven pulley of the CVT and a forward drive gear mounted to the countershaft. The snowmobile also includes a gearbox. The gearbox includes: a first shaft; a second shaft extending parallel to the first shaft; a plurality of gears mounted to the first shaft, including a plurality of first transmission gears and a driven gear engaging the forward drive gear; a plurality of second transmission gears mounted to the second shaft, each of the first transmission gears being in constant mesh with a corresponding one of the second transmission gears to form a plurality of gear pairings including a high gear pairing and a low gear pairing; and a housing enclosing the first and second transmission gears therein and rotatably supporting the first shaft and the second shaft, the countershaft partly extending within the housing and rotatably supported thereby. For each of the high and low gear pairings: a given one of the first and second transmission gears is in selective free-spin engagement with a corresponding one of the first shaft and the second shaft to which the given one of the first and second transmission gears is mounted; and an other one of the first and second transmission gears is in fixed engagement with a corresponding one of the first shaft and the second shaft to which the other one of the first and second transmission gears is mounted. A configurable portion of the countershaft extends laterally between the forward drive gear and an inner wall of the housing. A configurable portion of the second shaft is laterally aligned with the configurable portion of the countershaft. The snowmobile also includes a driveshaft coupled to the second shaft of the gearbox, the driveshaft being operatively connected to the drive track to propel the snowmobile. The snowmobile also includes a shifter operable by a user for selectively operating the gearbox in one of a high gear, a low gear and a neutral gear, such that: when the gearbox operates in the high gear, the shifter engages the given one of the first and second transmission gears corresponding to the high gear pairing to cause driving engagement thereof with the corresponding one of the first shaft and the second shaft; when the gearbox operates in the low gear, the shifter engages the given one of the first and second transmission gears corresponding to the low gear pairing to cause driving engagement thereof with the corresponding one of the first shaft and the second shaft; and when the gearbox operates in the neutral gear, the shifter is disengaged from the first and second transmission gears so that the given one of the first and second transmission gears of each of the high and low gear pairings remains in free-spin engagement with the corresponding one of the first shaft and the second shaft. The snowmobile is configured according to one of a first configuration and a second configuration. In the first configuration: the forward drive gear is rotationally fixed to the countershaft; the driven gear is rotationally fixed to the first shaft; the driven gear is in rotational engagement with the forward drive gear so that the first shaft is coupled to the countershaft; when rotating, the driveshaft rotates in a same direction as the countershaft; and the configurable portions of the countershaft and the second shaft are free of gears. In the second configuration: the forward drive gear is in selective free-spin engagement with the countershaft; the snowmobile also includes: a reverse drive gear mounted to the countershaft at the configurable portion of the countershaft, the reverse drive gear being in driving engagement with the countershaft; and an actuator for selectively transmitting rotary motion from the countershaft to the gearbox via a selected one of the forward drive gear and the reverse drive gear; and the gearbox also includes a reverse driven gear mounted to the second shaft at the configurable portion of the second shaft, enclosed within the housing of the gearbox, and configured to mesh with the reverse drive gear. When the selected one of the forward drive gear and the reverse drive gear is the forward drive gear: when rotating, the driveshaft rotates in the same direction as the countershaft; and the gearbox is operable in one of the high gear, the low gear and the neutral gear. When the selected one of the forward drive gear and the reverse drive gear is the reverse drive gear: when rotating, the driveshaft rotates in a reverse direction opposite to a direction of rotation of the countershaft.

In some embodiments, the gearbox also includes: a driving sprocket fixedly mounted to the second shaft and enclosed within the housing of the gearbox; an output sprocket fixedly mounted to the driveshaft and enclosed within the housing of the gearbox; and a flexible driving member drivingly connecting the driving sprocket to the output sprocket so as to transmit rotary motion from the second shaft to the driveshaft.

In some embodiments, the flexible driving member is a chain.

In some embodiments, the given one of the first and second transmission gears of each of the high and low gear pairings in selective free-spin engagement with the corresponding one of the first shaft and the second shaft is the first transmission gears such that: the first transmission gears are in selective free-spin engagement with the first shaft; and the second transmission gears are in fixed engagement with the second shaft.

In some embodiments, the shifter includes: a shifter knob movable between a high gear position, a low gear position and a neutral gear position corresponding to the high gear, the low gear and the neutral gear of the gearbox respectively; a dog mounted on the first shaft and slidable along an axis of the first shaft, the dog comprising dog teeth; and a plurality of links interconnecting the dog to the shifter knob. Each of the first transmission gears has dog teeth matching the dog teeth of the dog. When the shifter knob is moved to the high gear position, the dog engages the dog teeth of the first transmission gear corresponding to the high gear pairing. When the shifter knob is moved to the low gear position, the dog engages the dog teeth of the first transmission gear corresponding to the low gear pairing. When the shifter knob is moved to the neutral gear position, the dog is disengaged from the first transmission gears.

In some embodiments, in the neutral gear position of the shifter knob, the dog is mounted on the first shaft between the first transmission gear corresponding to the high gear pairing and the first transmission gear corresponding to the low gear pairing.

In some embodiments, the shifter also includes a support bracket for supporting the shifter knob, the support bracket being fastened to the housing of the gearbox.

In some embodiments, the housing of the gearbox includes a left housing portion and a right housing portion, the left and right housing portions being affixed to one another.

In some embodiments, the first shaft defines a first shaft axis about which the first shaft is rotatable; the second shaft defines a second shaft axis about which the second shaft is rotatable; and the first shaft axis is vertically higher than the second shaft axis.

In some embodiments, the driveshaft defines a driveshaft axis about which the driveshaft is rotatable, the second shaft axis being vertically higher than the driveshaft axis.

In some embodiments, the first transmission gears and the second transmission gears are helical gears.

In some embodiments, the gearbox is disposed on a right side of the engine.

In some embodiments, the CVT is disposed on a left side of the engine.

In some embodiments, the countershaft extends from the left side of the engine to the right side of the engine.

In some embodiments, the snowmobile also includes a pair of drive sprockets mounted to the driveshaft, the drive sprockets being in driving engagement with the drive track.

In some embodiments, the low gear pairing is disposed laterally between the high gear pairing and the CVT.

In some embodiments, the low gear pairing is disposed laterally between the forward drive gear and the high gear pairing.

In some embodiments, the low gear pairing is disposed laterally between the high gear pairing and the driven gear.

In some embodiments, the driven gear is disposed leftwardly of the low gear pairing.

In some embodiments, the driving sprocket is disposed laterally between the low gear pairing and the CVT.

In some embodiments, the low gear pairing is disposed laterally between the high gear pairing and the driving sprocket.

In some embodiments, the gearbox also includes: a driving sprocket fixedly mounted to the second shaft and enclosed within the housing of the gearbox, the driving sprocket being disposed laterally between the forward drive gear and the low gear pairing; an output sprocket fixedly mounted to the driveshaft and enclosed within the housing of the gearbox; and a flexible driving member drivingly connecting the driving sprocket to the output sprocket so as to transmit rotary motion from the second shaft to the driveshaft.

In some embodiments, in the second configuration: the actuator is operatively connected to the reverse drive gear; the reverse drive gear has dog teeth extending from a lateral side thereof; the forward drive gear has dog teeth configured for matching the dog teeth of the reverse drive gear, the dog teeth of the forward drive gear extending from a lateral side thereof; and when the selected one of the forward drive gear and the reverse drive gear is the forward drive gear, the actuator moves the reverse drive gear along the countershaft such that the dog teeth of the forward and reverse drive gears are engaged with one another thereby transmitting rotary motion from the reverse drive gear to the forward drive gear.

In some embodiments, in the second configuration: when the selected one of the forward drive gear and the reverse drive gear is the reverse drive gear, the actuator moves the reverse drive gear along the countershaft such that the reverse drive gear is in rotational engagement with the reverse driven gear thereby transmitting rotary motion from the reverse drive gear to the reverse driven gear.

In some embodiments, in the first configuration, the forward drive gear is a single gear mounted to the countershaft to drive the gearbox.

In some embodiments, the configurable portion of the countershaft is leftwardly of the forward drive gear.

In some embodiments, the configurable portion of the second shaft extends laterally between the plurality of second transmission gears and the inner wall of the housing.

In some embodiments, the configurable portion of the second shaft is leftwardly of the plurality of second transmission gears.

In some embodiments, the reverse drive gear and the reverse driven gear are spur gears.

In some embodiments, the forward drive gear and the driven gear are helical gears.

In some embodiments, the actuator is an electric actuator.

In some embodiments, the engine is a two-stroke engine.

In some embodiments, the engine is a four-stroke engine.

For purposes of this application, terms related to spatial orientation when referring to the vehicle orientation and positioning of its components such as forwardly, rearwardly, left, and right are as they would normally be understood by a driver of the vehicle sitting thereon in a normal riding position.

Embodiments of the present technology each have at least one of the above-mentioned aspects, but do not necessarily have all of them.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5A is a perspective view, taken from a front, right side, of the part of the gearbox and the countershaft of FIG. 4, with the gearbox being operated in a neutral gear;

FIG. 5B is a perspective view, taken from a front, right side, of the part of the gearbox and a countershaft FIG. 4, with the gearbox being operated in a low gear;

DETAILED DESCRIPTION

Figure 1:
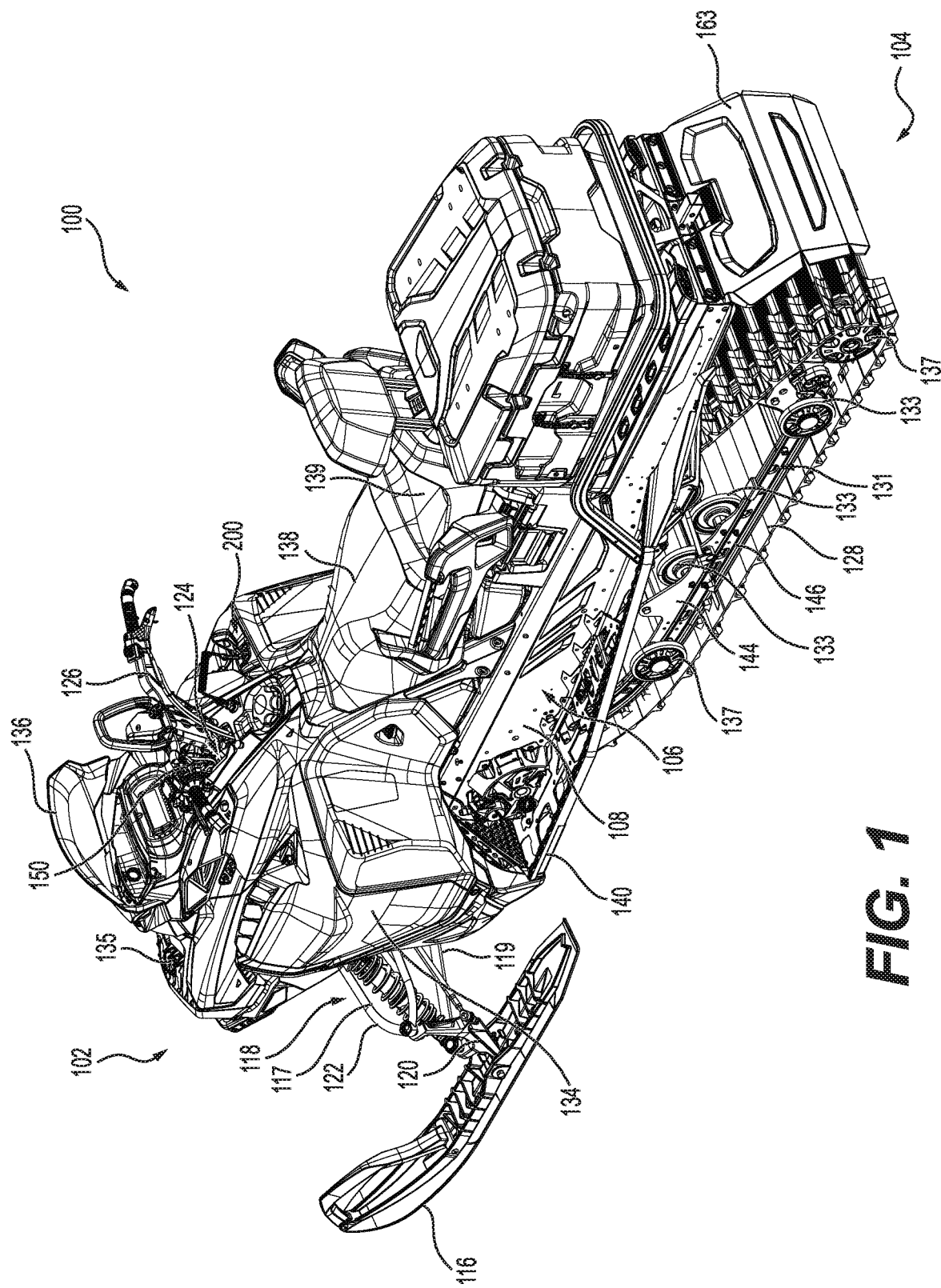
FIG. 1 is a perspective view, taken from a rear, left side, of a snowmobile.

With reference to FIG. 1, a snowmobile 100 will be described herein. The snowmobile 100 has a front end 102 and a rear end 104, which are defined consistently with the forward travel direction of the vehicle. The snowmobile 100 includes a frame 106 which includes a tunnel 108.

A ski and steering assembly is provided, in which two skis 116 (only one of which is shown in FIG. 1) are positioned at the front end 102 of the snowmobile 100, and are attached to a front portion of the frame 106 through a front suspension assembly 118.

The front suspension assembly 118 includes ski legs 120, supporting arms 122, spindles and ball joints for operatively joining the respective ski legs 120, supporting arms 122 and a steering column 124. The supporting arms 122 include left and right upper A-arms 117 and left and right lower A-arms 119 (only left upper and lower A-arms 117, 119 being shown in FIG. 1). It is contemplated that the front suspension assembly 118 could be different from the double A-arm suspension described above. At its upper end, the steering column 124 is attached to a handlebar 126 which is positioned forward of a user to rotate the ski legs 120 and thus the skis 116, in order to steer the snowmobile 100.

A straddle seat 138 is disposed rearward of the handlebar 126. A rear portion 139 of the straddle seat 138 provides a passenger seat. Two footrests 140 (only one of which is shown in FIG. 1) extend along opposite lateral sides of the snowmobile 100 below the straddle seat 138 to accommodate the riders' feet.

Figure 2:
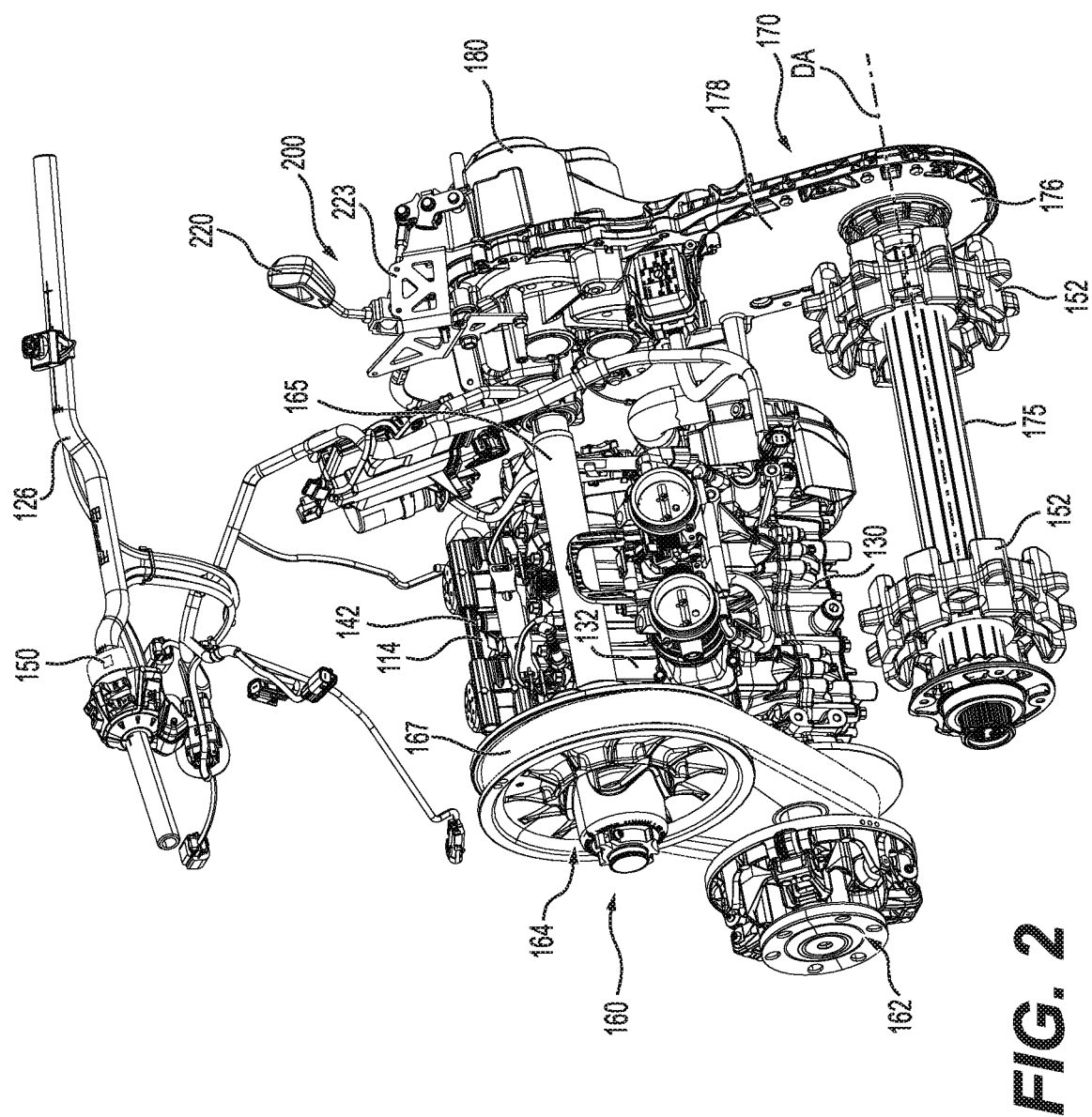
FIG. 2 is a perspective view, taken from a rear, left side, of part of the snowmobile of FIG. 1, including an engine, a continuous variable transmission (CVT), a gearbox, and a driveshaft.

An engine 114 (FIG. 2) is supported by the frame 106. In this embodiment, the engine 114 operates on a two-stroke engine cycle such that the engine 114 completes a power cycle with two strokes (an upstroke and a downstroke) of the engine's pistons (not shown). The engine 114 can thus be referred to as a two-stroke engine. With reference to FIG. 2, the engine 114 has a crankcase 130, a cylinder block 132 defining two cylinders (not shown) connected on top of the crankcase 130 and a cylinder head 142 connected on top of the cylinder block 132. The engine 114 also has a crankshaft (not shown) disposed in the crankcase 130 and driven by the motion of the pistons.

The engine 114 has an electronic reverse function for operating the engine 114 in reverse so that the crankshaft can be selectively rotated in a forward rotation direction and a reverse rotation direction. This is achieved by controlling the fuel injection and ignition within the cylinders of the engine 114. For instance, U.S. Pat. No. 5,036,802, issued Aug. 6, 1991, which is incorporated herein by reference, describes in detail a manner in which this electronic reverse function can be achieved. The electronic reverse function can be selectively activated via an electronic reverse function control element 150 (FIGS. 1, 2) disposed on the handlebar 126 of the snowmobile 100. In this embodiment, the electronic reverse function control element 150 is a push button which is selectively actuated by the user to engage or disengage the electronic reverse function of the engine 114.

As shown in FIG. 2, the engine 114 is connected to a continuously variable transmission (CVT) 160 disposed on a left side of the engine 114. The CVT 160 includes a drive pulley 162 operatively connected to the crankshaft of the engine 114, a driven pulley 164 disposed on a countershaft 165 for rotation therewith, and a transmission belt 167 disposed around both pulleys 162, 164 to transmit torque from the drive pulley 162 to the driven pulley 164. The driven pulley 164 is rearward and upward of the drive pulley 162 such that the countershaft 165 is located rearward and upward of the crankshaft of the engine 114. A cover (not shown) covers the pulleys 162, 164 and the transmission belt 167.

Each of the pulleys 162, 164 includes a movable sheave that can move axially relative to a fixed sheave to modify an effective diameter of the corresponding pulley 162, 164. The drive pulley 162 is a centrifugal pulley in that the sheaves thereof move in response to a centrifugal force applied thereon. The effective diameters of the pulleys 162, 164 are in inverse relationship. In the illustrated embodiment, the CVT 160 is a purely mechanical CVT 160, in which the diameter of the drive pulley 162 increases with increasing rotational speed of the drive pulley 162 (i.e., with increasing engine speed). The diameter of the driven pulley 164 therefore decreases when the torque required at the countershaft 165 increases. The CVT 160 may thus be referred to as an "unassisted" CVT in that a gear ratio of the CVT 160 (i.e., an effective diameter of the driven pulley 164 over the effective diameter of the drive pulley 162) is automatically mechanically adjusted in accordance with the speed of the engine 114 and the torque requirement at the countershaft 165.

It is contemplated that, in other embodiments, the CVT 160 could be an assisted CVT such as a hydraulic CVT.

A gearbox 170 disposed on the right side of the engine 114 is connected to the CVT 160 via the countershaft 165 such that the countershaft 165 extends from the left side to the right side of the engine 114. The gearbox 170, which will be described in greater detail below, provides a gearing system which allows the driver of the snowmobile 100 to change a "gear" in which the gearbox 170 is operated. Moreover, as will be described below, in some embodiments, the gearbox 170 can be operated in "reverse".

It is contemplated that, in other embodiments, the positions of the CVT 160 and the gearbox 170 could be switched such that the CVT 160 is disposed on the right side of the engine 114 and the gearbox 170 is disposed on the left side of the engine 114.

Returning to FIG. 1, at the front end 102 of the snowmobile 100, fairings 134 are provided that enclose the engine 114, the CVT 160, and the gearbox 170, thereby providing an external shell that not only protects these components of the snowmobile 100, but also make the snowmobile 100 more aesthetically pleasing. The fairings 134 include a hood 135 and one or more side panels which can be opened to allow access to the engine 114, the CVT 160 and the gearbox 170 when this is required, for example for inspection or maintenance thereof. A windshield 136 is connected to the fairings 134 in front of the handlebar 126. Alternatively, the windshield 136 can be attached directly to the handlebar 126. The windshield 136 acts as a windscreen to lessen the force of the air on the user while the snowmobile 100 is moving forward.

An endless drive track 128 is disposed under the tunnel 108. The endless drive track 128 is operatively connected to the engine 114 through the CVT 160 and the gearbox 170. The endless drive track 128 is driven to run about a rear suspension assembly 131 for propulsion of the snowmobile 100.

The rear suspension assembly 131 comprises front and rear shock absorbers (not shown). The front shock absorber extends rearwardly and downwardly from a front portion of the tunnel 108, and is disposed between the tunnel 108 and a slide frame assembly 144, partially forward of front suspension arms of the rear suspension assembly 131. The rear shock absorber extends forwardly and downwardly from a rear portion of the tunnel 108, and is disposed at least in part rearwardly of the front suspension arms. The slide frame assembly 144 includes a pair of spaced apart slide rails 146 that engage the inner side of the ground-engaging portion of the endless drive track 128. The slide frame assembly 144 journals a plurality of backup rollers 133 and four idler rollers 137. In addition, further rollers are carried by the tunnel 108, in order to define the path over which the endless drive track 128 travels. Other types of rear suspension assemblies are contemplated.

The endless drive track 128 is engaged with and driven by two drive sprockets 152 (FIG. 2) which are journaled by the tunnel 108 and are driven by the engine 114 via the CVT 160 and the gearbox 170. More specifically, the drive sprockets 152 are mounted to a driveshaft 175 which is operatively connected to the gearbox 170.

At the rear end 104 of the snowmobile 100, a snow flap 163 is connected to a rear end of the tunnel 108. The snow flap 163 protects against snow, ice, dirt or other debris that could be projected from the drive track 128 when driving. In some embodiments, the snow flap 163 also redirects snow and ice projected by the drive track 128 on the underside of the tunnel 108 where an engine heat exchanger (not shown) is provided. It is contemplated that the snow flap 163 could be omitted.

The snowmobile 100 includes other elements well known in the art, and as such they will not be described in detail herein.

The gearbox 170 and related components of the snowmobile 100 will now be described with reference to FIGS. 3 to 6.

The gearbox 170 includes a primary shaft 172, a secondary shaft 174, and a plurality of gears mounted to a respective one of the primary and the secondary shafts 172, 174. A housing 176 of the gearbox 170 encloses the primary and secondary shafts 172, 174 and their respective gears therein. The housing 176 includes a left portion 178 and a right portion 180 which are affixed to one another to enclose the components of the gearbox 170.

As briefly mentioned above, the countershaft 165 operatively connects the CVT 160 to the gearbox 170. In this embodiment, the countershaft 165 extends partly within the housing 176 of the gearbox 170 to drivingly engage the gearing of the gearbox 170. In particular, the countershaft 165 extends through a left portion 178 of the housing 176 and is rotatably supported by the housing 176 via two bearings 182 (FIG. 4) mounted to the countershaft 165, one of which is mounted to an end of the countershaft 165. The bearing 182 mounted to the end of the countershaft 165 is supported by the right portion 180 of the housing 176 and the other bearing 182 is supported by the left portion 178 of the housing 176. In order to drive the gearbox 170, a forward drive gear 184 is mounted to the countershaft 165 and rotates therewith. Notably, in this embodiment, the forward drive gear 184 is in driving engagement with a splined portion 186 of the countershaft 165. Furthermore, in this embodiment, the forward drive gear 184 is a single gear mounted to the countershaft 165 to drive the gearbox 170.

The countershaft 165 may alternatively be referred to as an "input shaft" as it transmits the input rotary motion into the gearbox 170. Similarly, the driveshaft 175 may alternatively be referred to as an "output shaft" as it transmits the output rotary motion from the gearbox 170.

The primary shaft 172 defines a primary shaft axis A1 extending laterally (i.e., parallel to the countershaft axis CA) about which the primary shaft 172 is rotatable. In particular, the primary shaft 172 is rotatably mounted to the housing 176 via bearings 188 mounted to the ends of the primary shaft 172. Notably, one of the bearings 188 mounted to a right end of the primary shaft 172 is supported by the right portion 180 of the housing 176 and the other bearing 188 mounted to a left end of the primary shaft 172 is supported by the left portion 178 of the housing 176. The primary shaft 172 is positioned rearward of the countershaft 165 such that the primary shaft axis A1 is rearward of the countershaft axis CA. Moreover, the primary shaft axis A1 is vertically higher than the countershaft axis CA. A forward driven gear 190 is mounted to the primary shaft 172 and rotates therewith. A splined connection is implemented between the forward driven gear 190 and a splined portion of the primary shaft 172. In this embodiment, the gearbox 170 is driven by the countershaft 165 via the forward driven gear 190. More specifically, the forward driven gear 190 is in rotational engagement with the forward drive gear 184 so that the primary shaft 172 is coupled to the countershaft 165.

Two primary transmission gears 192L, 192H are mounted to the primary shaft 172 and are spaced from one another. The primary transmission gears 192L, 192H are used to transmit motion from the primary shaft 172 to the secondary shaft 174. In particular, as will be described below, one of the primary transmission gears 192L, 192H is selected to transmit motion to the secondary shaft 174 in accordance with a desired torque and speed. To that end, the primary transmission gears 192L, 192H are configured differently. Notably, the primary transmission gear 192L is smaller in diameter than the primary transmission gear 192H.

Figure 15:
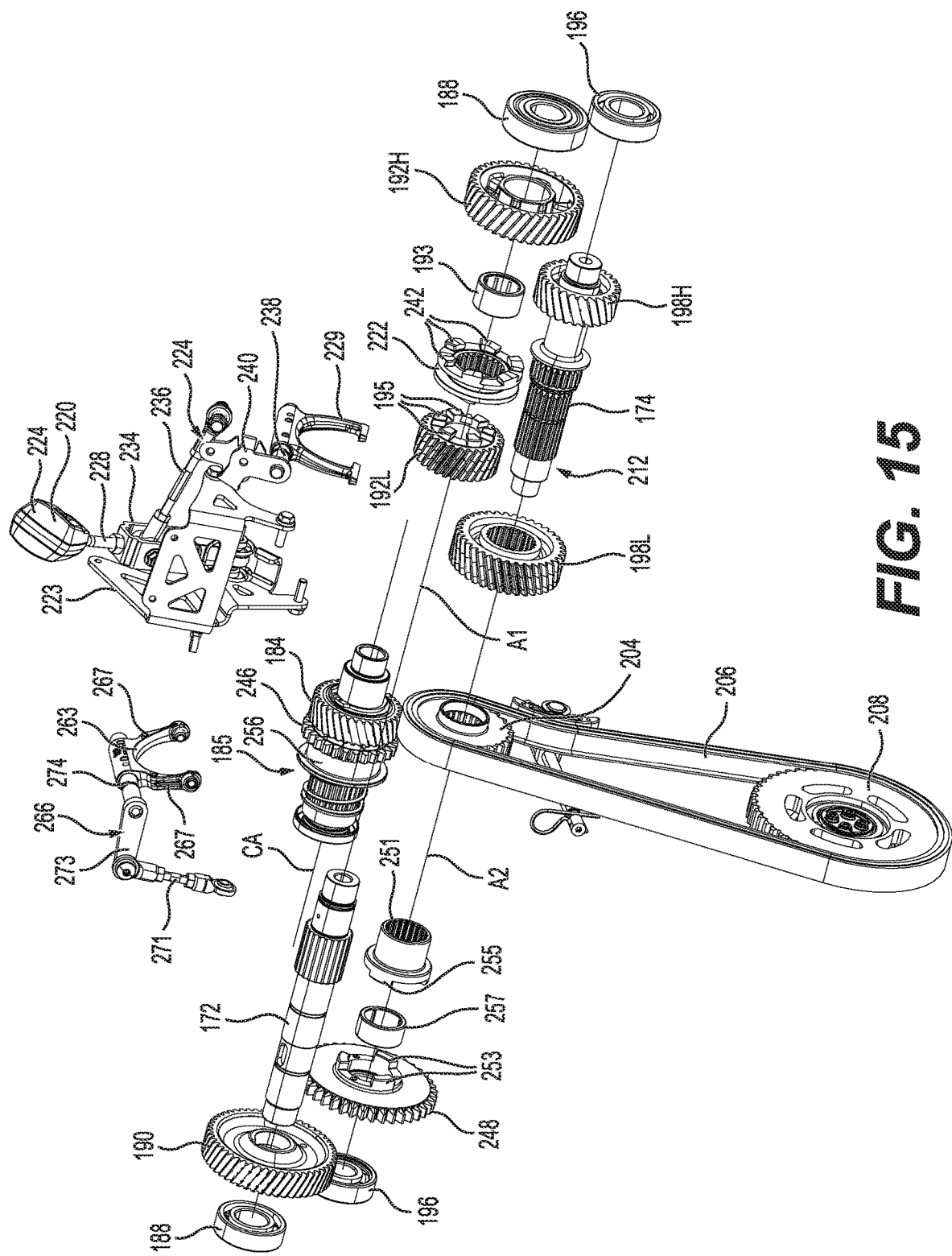
FIG. 15 is an exploded view, taken from a rear, right side, of part of the gearbox, part of the countershaft of the configuration of the snowmobile of FIG. 7.

In this embodiment, the primary transmission gears 192L, 192H are in selective free-spin engagement with the primary shaft 172. In particular, the primary transmission gear 192L is loosely fitted to the primary shaft 172, while the primary transmission gear 192H is mounted to the primary shaft 172 via a needle bearing 193 (FIG. 15). As such, on their own, the primary transmission gears 192L, 192H and the primary shaft 172 are drivingly disengaged. It is contemplated that, in other embodiments, the primary transmission gear 192L could be rotatably mounted to the primary shaft 172 via a bearing, or the primary transmission gear 192H could be loosely fitted to the primary shaft 172. As will be described in greater detail below, a shifter 200 is used to select which of the primary transmission gears 192L, 192H, if any, to place into driving engagement with the primary shaft 172. In order to engage the shifter 200, each of the primary transmission gears 192L, 192H has dog teeth 195 (shown for the primary transmission gear 192L in FIG. 4) which are engaged by the shifter 200 when one of the primary transmission gears 192L, 192H is selected to be placed into driving engagement with the primary shaft 172. In particular, the primary transmission gear 192L has the dog teeth 195 on its right side (i.e., facing the primary transmission gear 192H) while the primary transmission gear 192H has the dog teeth 195 on its left side (i.e., facing the primary transmission gear 192L).

A deflector 194 is fastened to the housing 176 and partially surrounds a part of the primary shaft 172. The deflector 194 is configured to deflect lubricant (i.e., oil) which is projected from a flexible driving member 206 towards the primary transmission gears 192L, 192H. The forward driven gear 190 and the primary transmission gears 192L, 192H are disposed on opposite sides of the deflector 194.

Figure 4:
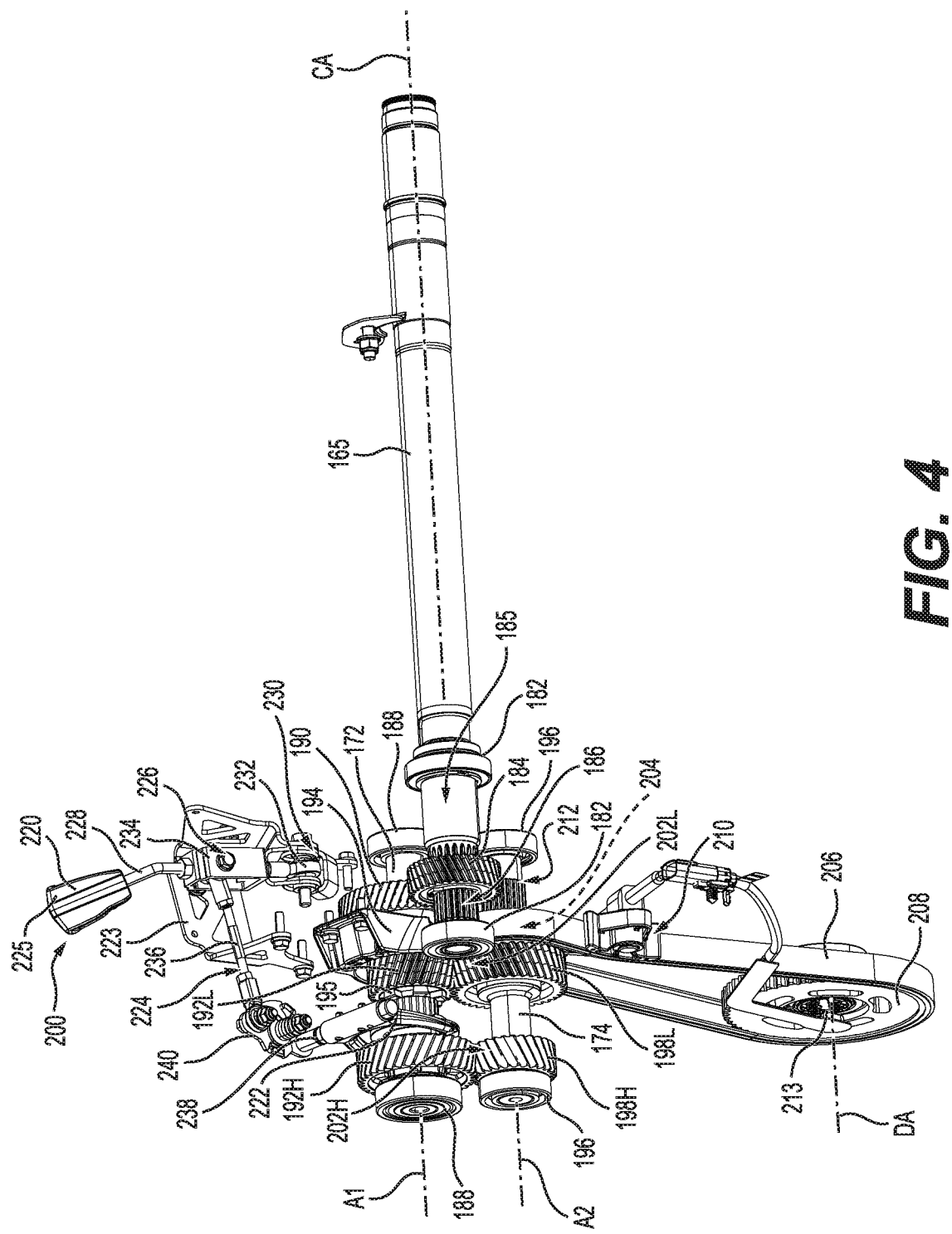
FIG. 4 is a perspective view, taken from a front, right side, of part of the gearbox and the countershaft of the snowmobile of FIG. 1, with the gearbox being operated in a high gear.

The secondary shaft 174 defines a secondary shaft axis A2 extending parallel to the primary shaft axis A1 (i.e., laterally) and about which the secondary shaft 174 is rotatable. In particular, the secondary shaft 174 is rotatably mounted to the housing 176 via bearings 196 mounted to the ends of the secondary shaft 174. Notably, one of the bearings 196 mounted to a right end of the secondary shaft 174 is supported by the right portion 180 of the housing 176 and the other bearing 196 mounted to a left end of the secondary shaft 174 is supported by the left portion 178 of the housing 176. As can be seen in FIG. 4, the primary shaft axis A1 is vertically higher than the secondary shaft axis A2. The secondary shaft axis A2 is also vertically lower than the countershaft axis CA. Moreover, the secondary shaft axis A2 is disposed rearwardly of the primary shaft axis A1 and rearwardly of the countershaft axis CA.

Two secondary transmission gears 198L, 198H are mounted to the secondary shaft 174 and are spaced from one another. In this embodiment, the secondary transmission gears 198L, 198H are in fixed engagement with the secondary shaft 174 (i.e., the secondary transmission gears 198L, 198H are drivingly engaged by the secondary shaft 174). The secondary transmission gear 198L has a greater diameter than the secondary transmission gear 198H.

In this embodiment, the primary and secondary transmission gears 192L, 192H, 198L, 198H are helical gears.

It is contemplated that, in other embodiments, the secondary transmission gears 198L, 198H could be in selective free-spin engagement with the secondary shaft 174 while the primary transmission gears 192L, 192H are in fixed engagement with the primary shaft 172. For example, in such embodiments, the secondary transmission gears 198L, 198H are provided with the dog teeth instead of the primary transmission gears 192L, 192H, and the shifter 200 is connected to the secondary shaft 174 to selectively engage one of the secondary transmission gears 198L, 198H.

The primary and secondary transmission gears 192L, 198L, are in constant mesh with one another to form a low gear pairing 202L. The primary and secondary transmission gears 192H, 198H, are in constant mesh with one another to form a high gear pairing 202H. These gear pairings 202L, 202H can be selectively chosen, via the shifter 200, to transmit rotary motion from the countershaft 165 to the driveshaft 175 in order to affect the speed and torque at the driveshaft 175. Notably, as will be understood, the gear pairings 202L, 202H offer different gear ratios for transmitting motion from the primary shaft 172 to the secondary shaft 174. For instance, the low gear pairing 202L is selected to transmit motion from the primary shaft 172 to the secondary shaft 174 when a greater torque is desired, whereas the high gear pairing 202H is selected to transmit motion from the primary shaft 172 to the secondary shaft 174 when a greater speed is desired. As such, the high gear pairing 202H is associated with a "high gear" of the gearbox 170 while the low gear pairing 202L is associated with a "low gear" of the gearbox 170. The gearbox 170 is thus described as operating in high gear when the shifter 200 engages the high gear pairing 202H (FIG. 4) and as operating in low gear when the shifter 200 engages the low gear pairing 202L (FIG. 5B). As will be described in more detail below, the gearbox 170 can also be operated in "neutral gear" whereby none of the gear pairings 202L, 202H are engaged by the shifter 200 (i.e., the primary transmission gears 172L, 172H are disengaged by the shifter 200) (FIG. 5A).

It is contemplated that the gearbox 170 could be operated in additional gears (e.g., a second high gear, a second low gear) by providing additional gear pairings.

The shifter 200 can thus be operated by the user to place one of the primary transmission gears 192L, 192H of a selected one (or none) of the gear pairings 202L, 202H into driving engagement with the primary shaft 172 (via the matching dog teeth 195, 242 as described above) which in turn engages the corresponding secondary transmission gear 198L, 198H.

In this embodiment, the high gear pairing 202H is disposed rightwardly of the low gear pairing 202L. As such, the low gear pairing 202L is disposed laterally between the high gear pairing 202H and the CVT 160. The low gear pairing 202L is also disposed laterally between the forward drive gear 184 and the high gear pairing 202H. Similarly, the low gear pairing 202L is disposed laterally between the high gear pairing 202H and the forward driven gear 190. As such, the forward driven gear 190 is disposed leftwardly of the low gear pairing 202L.

Figure 3:
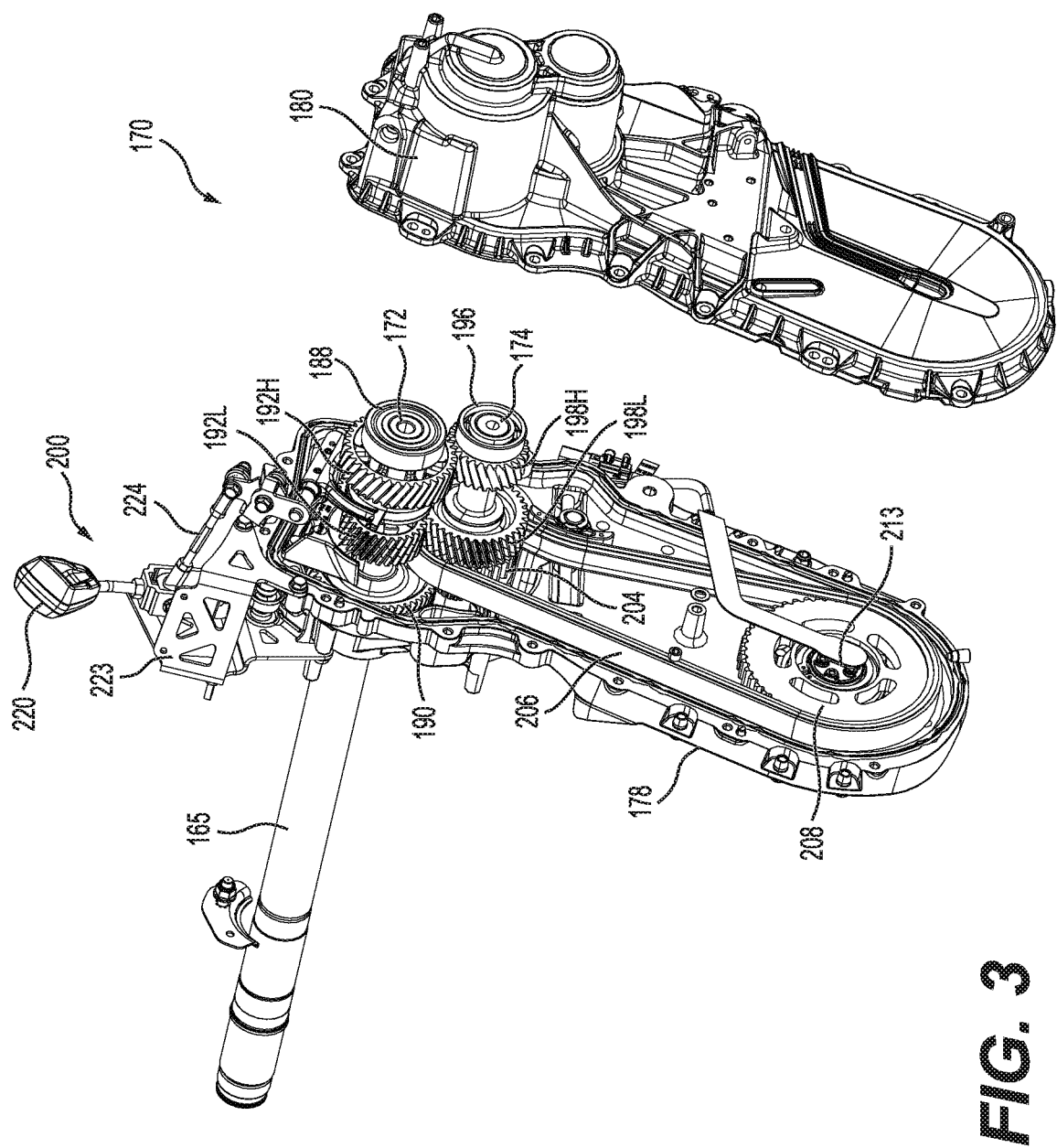
FIG. 3 is a perspective view, taken from a rear, right side, of the gearbox and a countershaft of the snowmobile of FIG. 1, with a housing of the gearbox being open to expose various components of the gearbox.

As shown in FIG. 3, a driving sprocket 204 is fixedly mounted to the secondary shaft 174 and enclosed within the housing 176. The driving sprocket 204 is disposed leftwardly of the secondary transmission gears 198L, 198H and is generally laterally aligned with the divider 194. In particular, the driving sprocket 204 is disposed laterally between the low gear pairing 202L and the CVT 160. As such, the low gear pairing 202L is disposed laterally between the high gear pairing 202H and the driving sprocket 204.

The driving sprocket 204 is operatively connected to the driveshaft 175. Notably, the flexible driving member 206 drivingly connects the driving sprocket 204 to an output sprocket 208 fixedly mounted to the driveshaft 175 and enclosed within the housing 176. As such, rotary motion is transmitted from the secondary shaft 174 to the driveshaft 175 via the driving and output sprockets 204, 208 and the flexible driving member 206. The driveshaft 175 is thus coupled to the secondary shaft 174.

The driveshaft 175 defines a driveshaft axis DA about which the driveshaft 175 and the output sprocket 208 are rotatable. The driveshaft axis DA is vertically lower than and rearward of the secondary shaft axis A2 about which the driving sprocket 204 rotates.

The flexible driving member 206 may be any suitable type of flexible driving member. In this embodiment, the flexible driving member 206 is a chain which engages the teeth of the sprockets 204, 208. In other embodiments, the flexible driving member 206 may be a rubber belt for example. Moreover, an adjustable tensioner 210 (FIG. 4) is provided to regulate tension in the flexible driving member 206. In this embodiment, the tensioner 210 applies pressure on an outer side of the flexible driving member 206. The tensioner 210 is supported by the housing 176.

As shown in FIGS. 3 to 5B, a speed sensor 213 is supported by the housing 176 and is configured to measure the speed of the driveshaft 175.

As shown in FIG. 4, a configurable portion 212 of the secondary shaft 174 extends leftwardly from the driving sprocket 204 (and thus leftwardly of the second transmission gears 198L, 198H). In particular, the configurable portion 212 extends laterally between the forward drive gear 184 and an inner wall of the housing 176 defined by the left portion 178 of the housing 176. In this configuration of the snowmobile 100, the configurable portion 212 of the secondary shaft 174 is free of any gears mounted thereto. As will be discussed in greater detail below, in another configuration of the snowmobile 100, a gear is mounted to the configurable portion 212 of the secondary shaft 174 for transmitting rotary motion to the secondary shaft 174 otherwise than through the primary shaft 172 (i.e., without going through the primary shaft 172). Likewise, the countershaft 165 has a configurable portion 185 extending laterally between the forward drive gear 184 and an inner wall of the housing 176 defined by the left portion 178 of the housing 176. As such, the configurable portion 185 extends leftwardly of the forward drive gear 184. Similarly to the configurable portion 212 of the secondary shaft 174, in this configuration of the snowmobile 100, the configurable portion 185 of the countershaft 165 is free of any gears mounted thereto. The configurable portions 185, 212 of the countershaft 165 and the secondary shaft 174 are laterally aligned with one another.

The shifter 200 is operable by the user of the snowmobile 100 for selectively operating the gearbox in one of the high gear, the low gear and a neutral gear. With reference to FIGS. 4 to 5B, the shifter 200 includes a shifter knob 220, a dog 222, and a link assembly 224 interconnecting the dog 222 to the shifter knob 220. The shifter 200 also has a support bracket 223 for supporting the shifter knob 220. The support bracket 223 is fastened to the housing 176.

Figure 6:
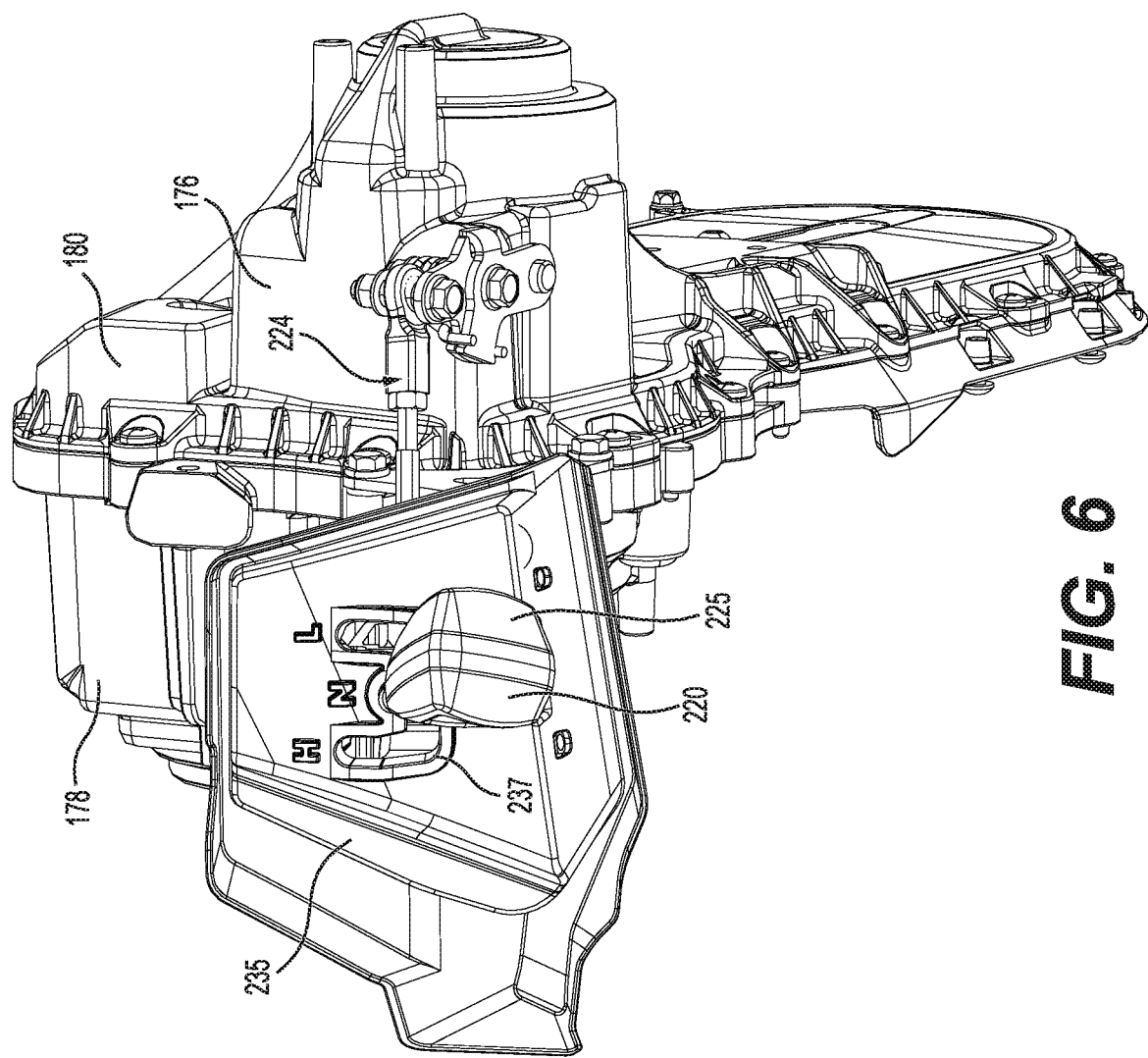
FIG. 6 is a top plan view of the gearbox and of a shifter of the snowmobile of FIG. 1.

With reference to FIG. 6, the shifter knob 220 is movable between different positions to select a gear in which to operate the gearbox 170. More specifically, the shifter knob 220 is movable between a high gear position, a low gear position and a neutral gear position corresponding to the high gear, the low gear and the neutral gear of the gearbox 170 respectively. As shown in FIG. 4, the shifter knob 220 has a knob portion 225, a base portion 226 and a shaft 228 interconnecting the knob portion 225 to the base portion 226. The knob portion 225 is configured to be handled by the user's hand. A connector 234 of the base portion 226 is connected to the dog 222 via the link assembly 224. The base portion 226 defines a pivot 230 at its bottom end, implemented via a rod end 232. The shifter knob 220 is pivotable frontwardly and rearwardly about the pivot 230. The shifter knob 220 is moved leftwardly or rightwardly to a selected one of the high gear, low gear and neutral gear positions. Notably, as can be seen in FIG. 6, a path of the shifter knob 220 is from left to right as it moves from the high gear position, to the neutral gear position and to the low gear position in order to cause the dog 222 to move accordingly laterally along the primary shaft 172. A shifter cover 235 (FIG. 6) covers part of the shifter 200, with the knob portion 225 and the shaft 228 protruding through an aperture 237 of the shifter cover 235. The aperture 237 defines the path of the shifter knob 220 as it is moved through the different gear positions. As can be seen from the aperture 237, once the shifter knob 220 is in the correct position for the desired gear, the shifter knob 220 is moved forwardly along a corresponding longitudinal-extending portion of the aperture 237 so that the gearbox 170 stays engaged in the selected gear. To that end, a spring 239 (FIGS. 5A, 5B) is provided at the pivot 230 to bias the shifter knob 220 forwardly and into the longitudinally-extending portion of the aperture 237 corresponding to the selected gear. In order to change gears, the shifter knob 220 is thus moved rearwardly (against the biasing force of the spring 239) to disengage the corresponding longitudinally-extending portion of the aperture 237 and then moved laterally to another gear position.

The link assembly 224 includes a generally laterally-extending link 236, a generally longitudinally-extending link 238 and an interconnecting bracket 240 to which each of the links 236, 238 is connected. The laterally-extending link 236 has one end fastened to the connector 234 of the base portion 226 of the shifter knob 220. Another end of the laterally-extending link 236 is fastened to the interconnecting bracket 240. The longitudinally-extending link 238 has one end fastened to the interconnecting bracket 240 and the other end fastened to the dog 222.

The dog 222 is mounted on the primary shaft 172 and is slidable along the primary shaft axis A1. An inner part of the dog 222 is drivingly engaged with the primary shaft 172 and thus rotates therewith. Notably, an inner periphery of the dog 222 is splined to engage the splines on the primary shaft 172. A fork 229 (FIGS. 5A, 5B) of the dog 222 is rotatable relative to the inner part of the dog 222 and is connected to the link 238. As shown in FIGS. 5A and 5B, the dog 222 has dog teeth 242 on the left and right sides of the dog 222 which match the dog teeth 195 of the primary transmission gears 192L, 192H. The dog teeth 242 of the dog 222 are configured to engage and thereby drive the primary transmission gears 192L, 192H via the dog teeth 195 thereof.

Notably, when the shifter knob 220 is moved to the high gear position (FIG. 4), the dog 222 slides right and engages the dog teeth 195 of the primary transmission gear 192H corresponding to the high gear pairing 202H. When the shifter knob 220 is moved to the low gear position (FIG. 5B), the dog 222 slides left and engages the dog teeth 195 of the primary transmission gear 192L corresponding to the low gear pairing 202L. When the shifter knob 220 is moved to the neutral gear position (FIG. 5A), the dog 222 slides to a position between the primary transmission gears 192L, 192H and is disengaged from the primary transmission gears 192L, 192H.

By operating the gearbox 170 via the shifter 220 and controlling the rotation direction of the crankshaft of the engine 114 via the reverse function control element 150, the user of the snowmobile 100 can choose to operate the gearbox 170 in any of the high, low and neutral gears while the crankshaft of the engine 114 rotates in the forward rotation direction or the reverse rotation direction. As such, the user may have a greater degree of control of the speed and torque delivered to the drive track 128 when the snowmobile 100 moves in reverse. The gearbox 170 is said to be in "reverse operation" when the crankshaft of the engine 114 rotates in the reverse rotation direction, namely since the driveshaft 175, when rotating, rotates in a direction that is associated with rearward driving direction of the snowmobile 100 (when the handlebar 126 is oriented to steer the skis 116 straight). In some embodiments, when the crankshaft of the engine 114 rotates in reverse, the gearbox 170 may be limited to operating in one or two of the high, low and neutral gears. For example, in some embodiments, when the crankshaft of the engine 114 rotates in reverse, the gearbox 170 may be limited to operating in the low gear.

It is contemplated that the shifter knob 220 of the shifter 200 could be replaced by an electric actuator which is operated by the user via buttons (e.g., provided on the handlebar 126) such as to provide electric shifting.

As will be described in greater detail below, the snowmobile 100 can be configured according to two different configurations. The two different configurations of the snowmobile 100 implement different ways in which the reverse operation of the gearbox 170 can be achieved. An example of the first configuration of the snowmobile 100 is described above with respect to FIGS. 3 to 6, whereby the reverse operation of the gearbox 170 is achieved by operating the engine 114 in the reverse rotation direction.

The second configuration of the snowmobile 100 that allows reverse operation of the gearbox 170 will now be described below with respect to FIGS. 7 to 14. In the second configuration of the snowmobile 100, the snowmobile 100 has an engine 314 (schematically illustrated in FIG. 7) which, unlike the engine 114, does not have an electronic reverse function and thus the reverse operation of the gearbox 170 is provided by driving components of the snowmobile 100 other than the engine 314, namely including the gearbox 170. In this embodiment, in the second configuration of the snowmobile 100, the engine 314 is a four-stroke engine operating on a four-stroke engine cycle such that the engine 314 completes a power cycle with four strokes (two upstrokes and two downstrokes) of the engine's piston(s). Indeed, the second configuration of the snowmobile 100 may be particularly useful for four-stroke engines as their crankshafts can only be rotated in a single rotation direction. Alternatively, the engine 314 in the second configuration of the snowmobile 100 could be a two-stroke engine which does not implement the electronic reverse function described above.

Figure 7:
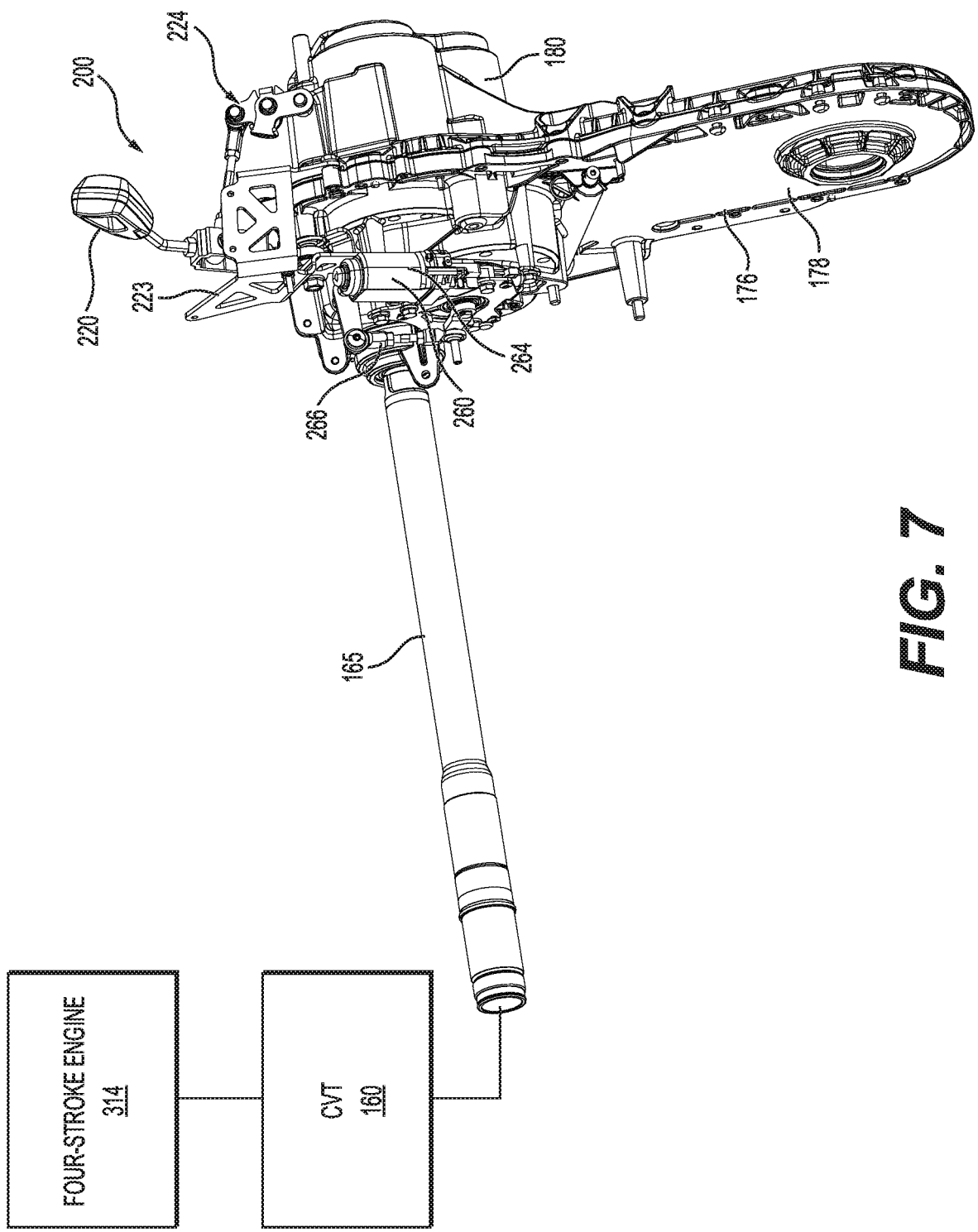
FIG. 7 is a perspective view, taken from a rear, left side, of the gearbox and the countershaft in accordance with another configuration of the snowmobile.
Figure 8:
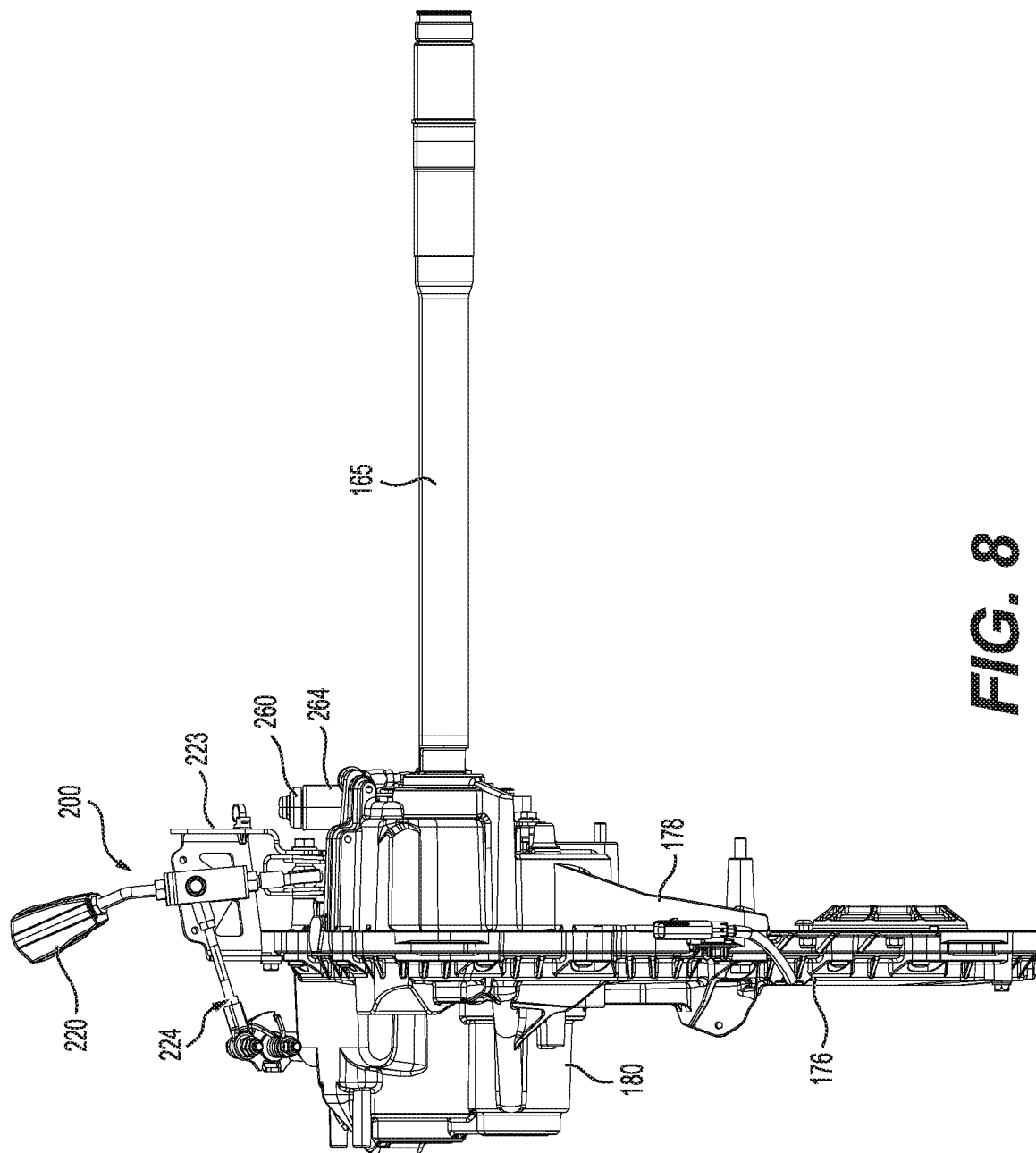
FIG. 8 is a front elevation view of the gearbox and the countershaft of the configuration of the snowmobile of FIG. 7.
Figure 9:
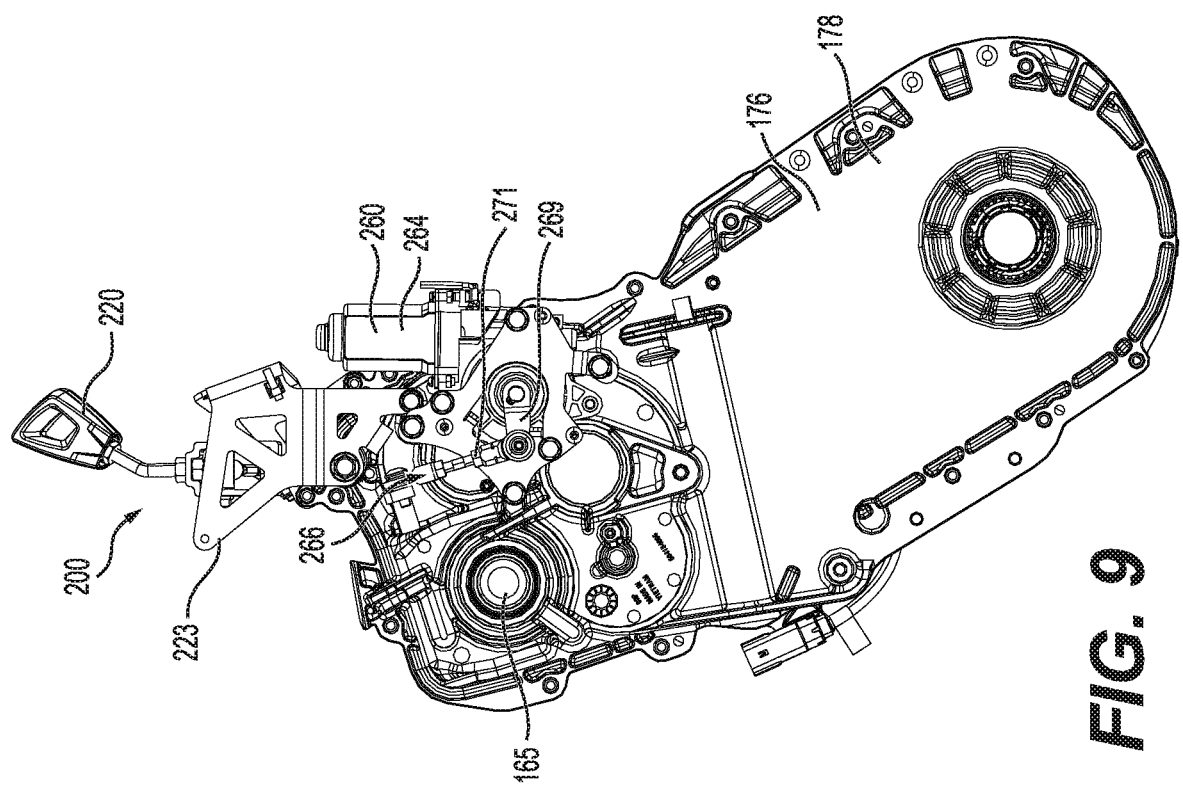
FIG. 9 is a left side elevation view of the gearbox and the countershaft of the configuration of the snowmobile of FIG. 7.
Figure 10:
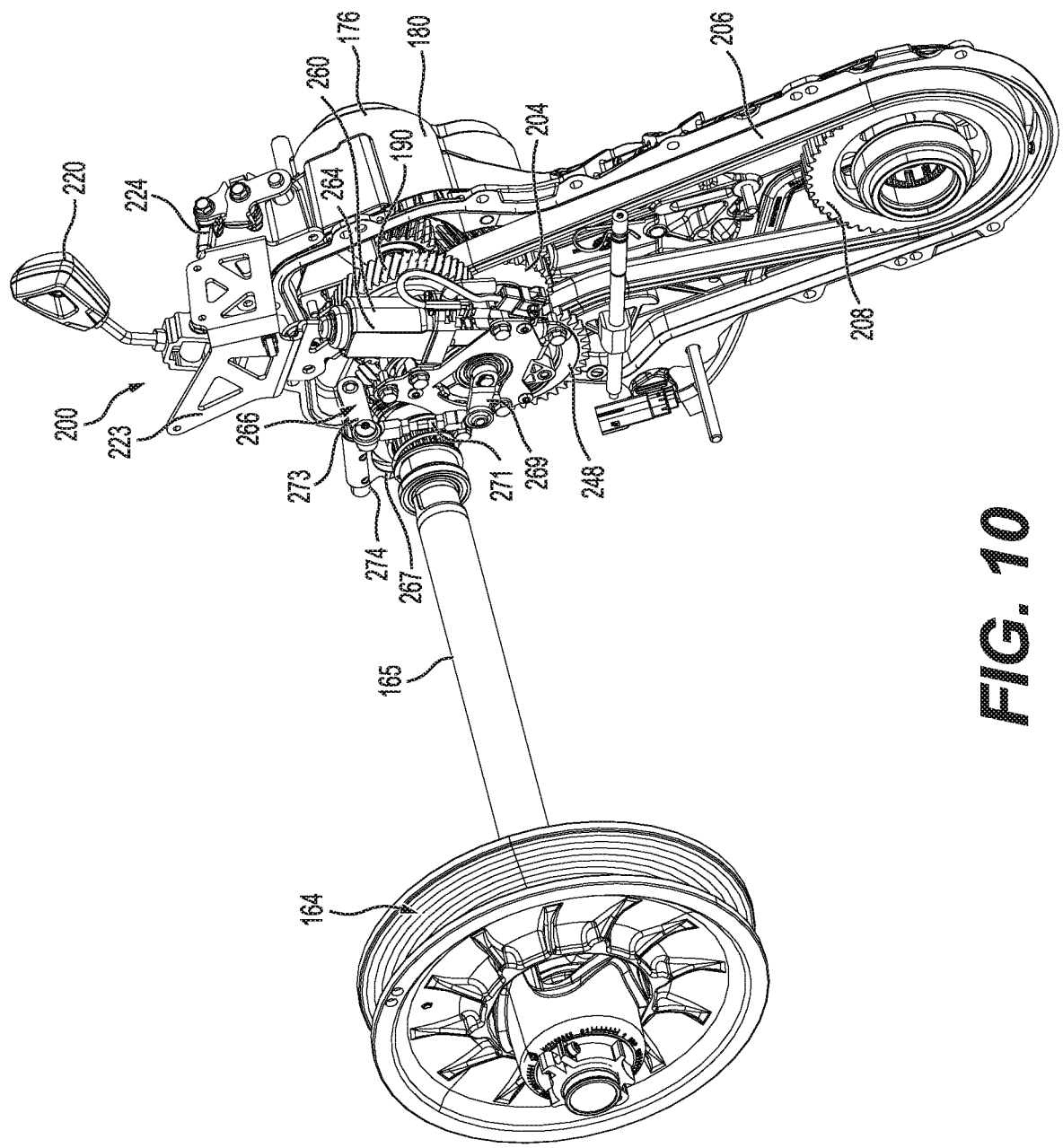
FIG. 10 is a perspective view, taken from a rear, left side, of part of the CVT, the countershaft and the gearbox of the configuration of the snowmobile of FIG. 7, with a left portion of the housing of the gearbox removed to expose internal components of the gearbox.

As shown in FIG. 7, the engine 314 is operatively connected to the countershaft 165 via the CVT 160 described above.

Figure 12:
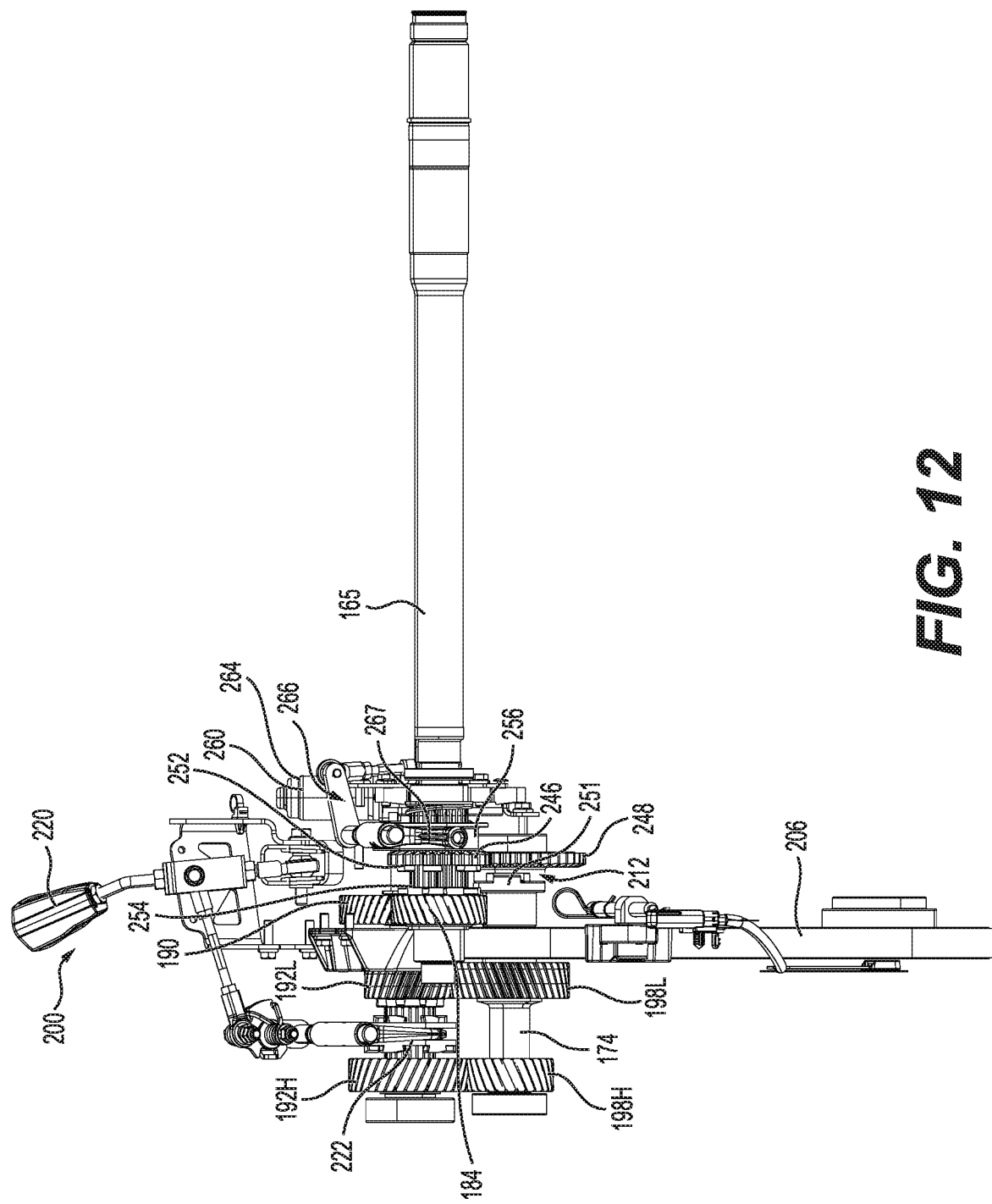
FIG. 12 is a front elevation view of part of the gearbox and the countershaft in accordance the configuration of the snowmobile of FIG. 7, in which the gearbox is in a reverse operation mode.
Figure 13:
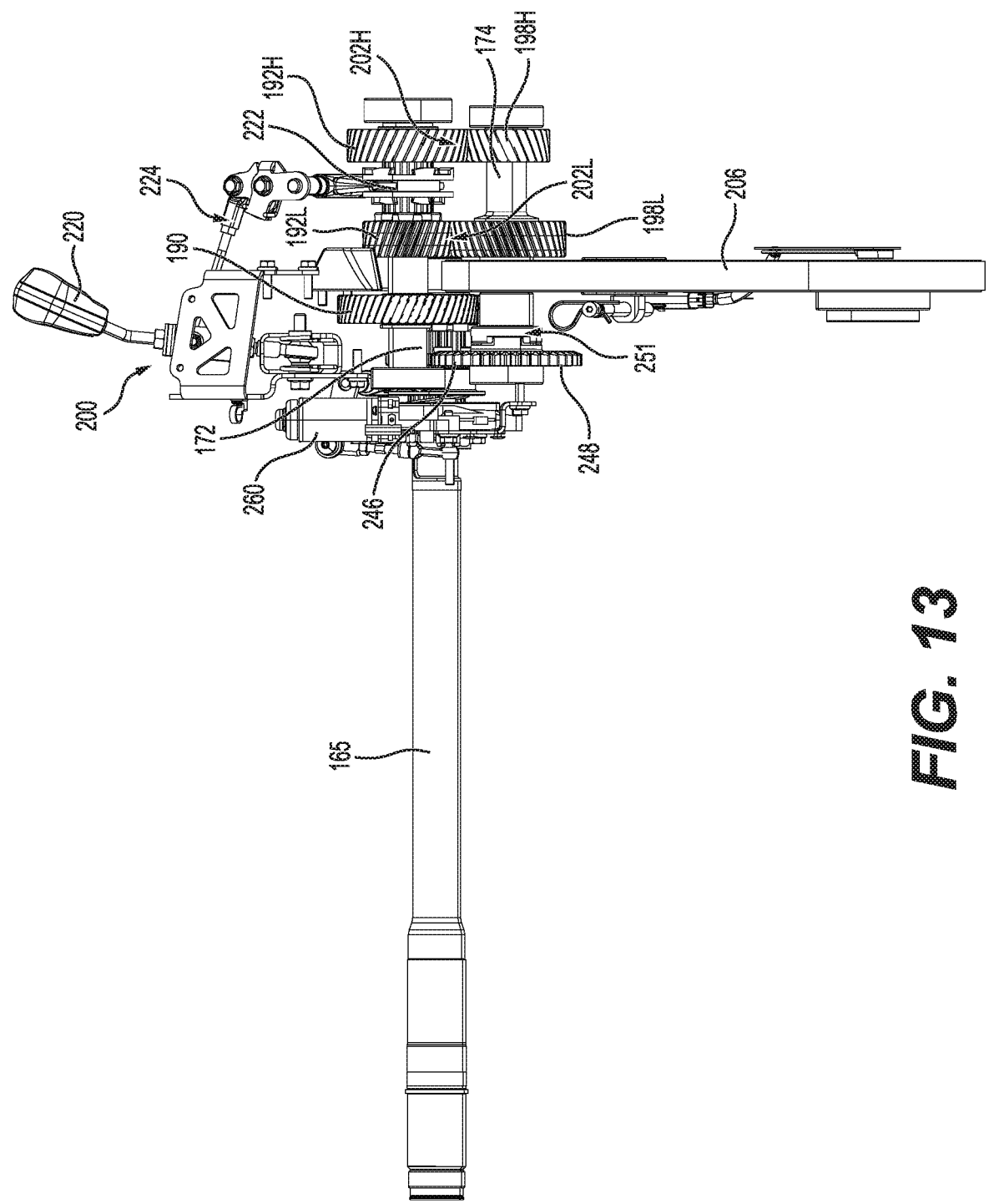
FIG. 13 is a rear elevation view of the part of the gearbox and the countershaft of FIG. 10, in which the gearbox is in the reverse operation mode.
Figure 14:
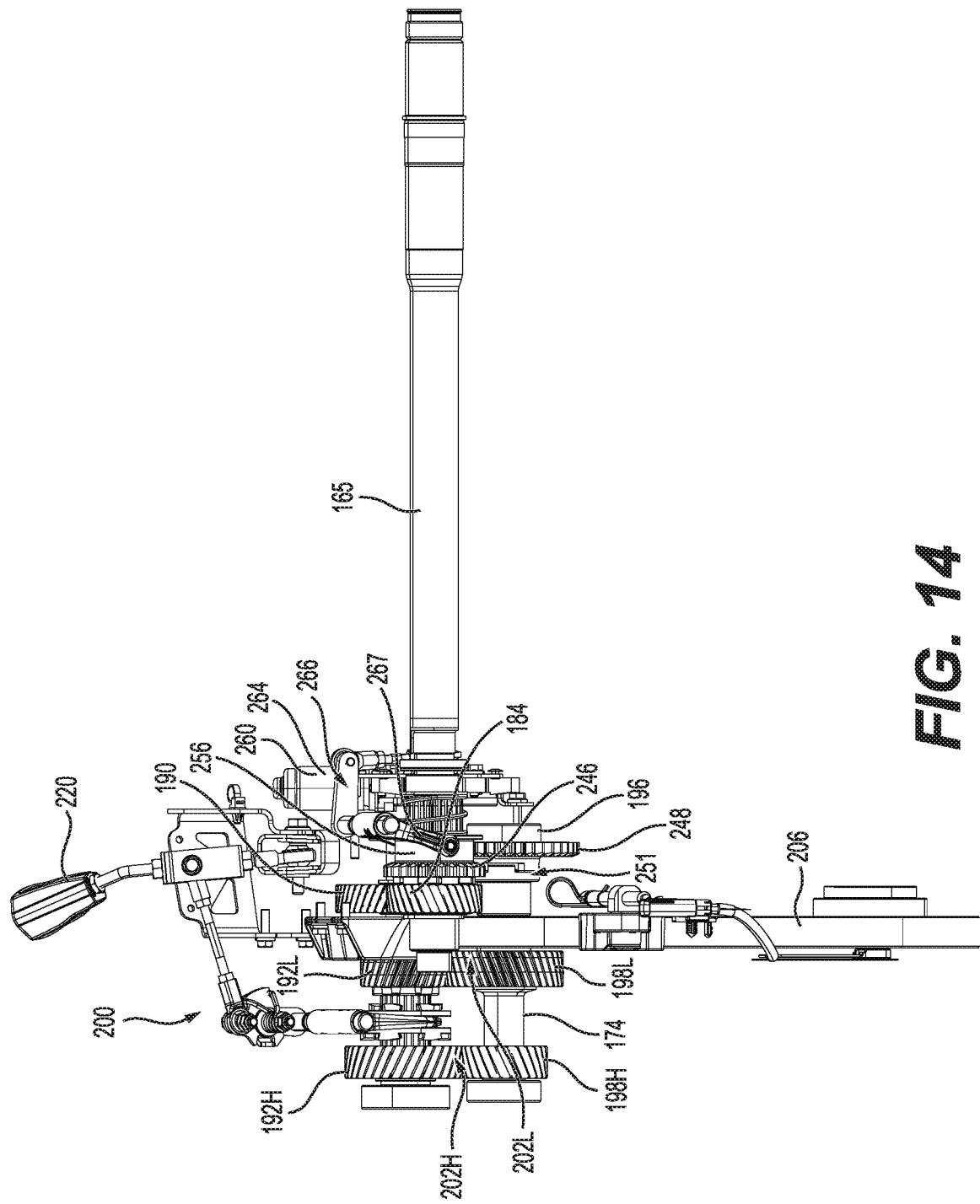
FIG. 14 is a front elevation view of the part of the gearbox and of the countershaft of FIG. 7, in which the gearbox is in a forward operation mode.

As shown in FIGS. 12 to 14, in the second configuration of the snowmobile 100, the forward drive gear 184 is in selective free-spin engagement with the countershaft 165. As such, the forward drive gear 184 drives the primary shaft 172 only when it is selected to do so.

Moreover, in the second configuration of the snowmobile 100, the snowmobile 100 includes a reverse drive gear 246 mounted to the countershaft 165 at the configurable portion 185 of the countershaft 165 and in driving engagement with the countershaft 165. In particular, the reverse drive gear 246 is drivingly connected to the countershaft 165 via a splined connection therebetween. The reverse drive gear 246 is enclosed within the housing 176 and, as will be described in greater detail below, is slidable along the countershaft 165. The reverse drive gear 246 also has dog teeth 252 extending from a right side thereof. Notably, in this second configuration of the snowmobile 100, the forward drive gear 184 has dog teeth 254 which are configured for matching the dog teeth 252 of the reverse drive gear 246. The dog teeth 254 of the forward drive gear 184 extend from a left side thereof (i.e., facing the reverse drive gear 246).

Figure 11:
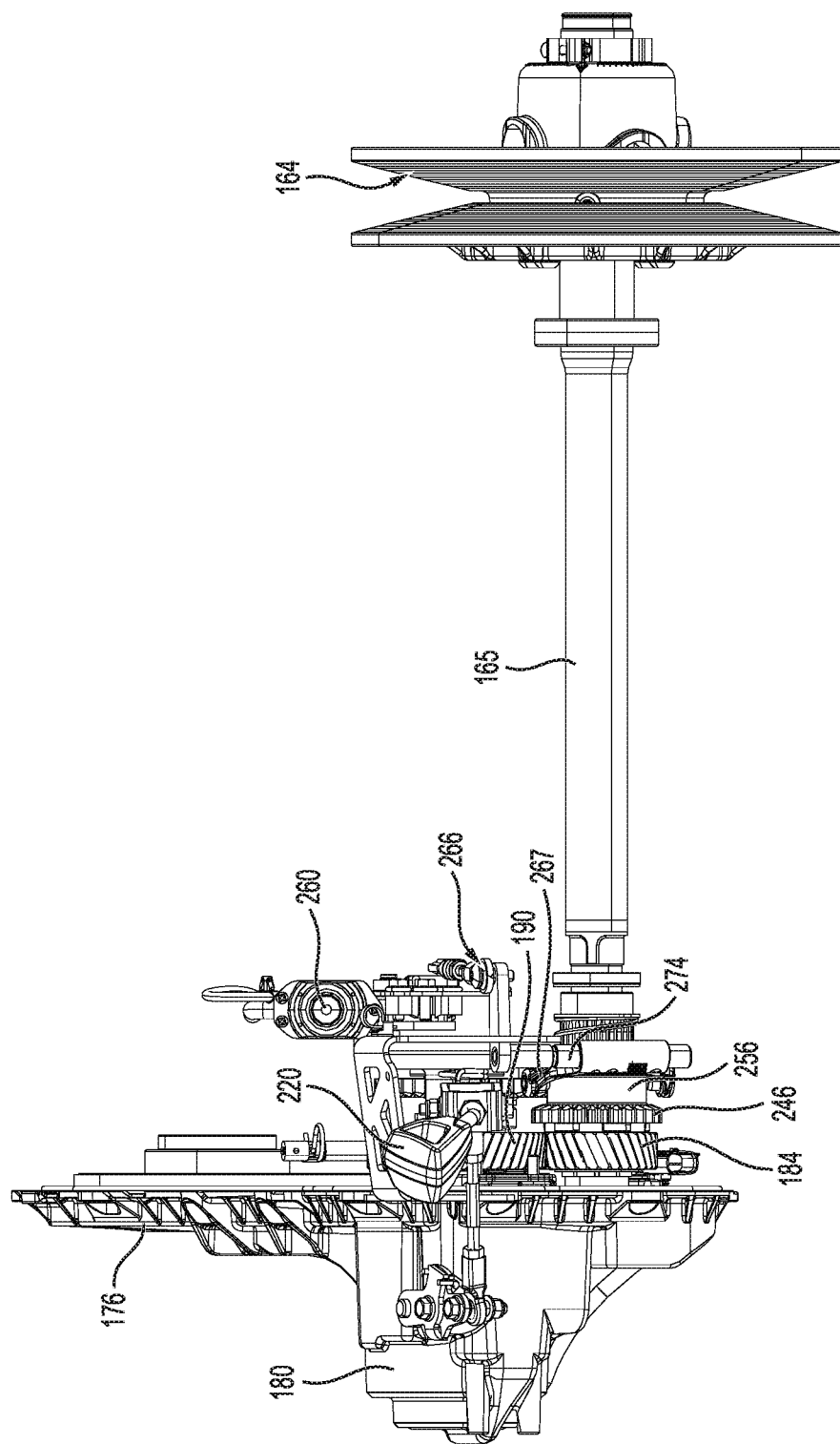
FIG. 11 is a top plan view of the components of the snowmobile of FIG. 10.

As can be seen in FIGS. 11, 12 and 14, a support collar 256 is rotatably connected to the reverse drive gear 246 on a left side thereof. That is, the support collar 256 can rotate relative to the reverse drive gear 246 such that, when the reverse drive gear 246 rotates with the countershaft 165, the support collar 256 remains in the same rotational position about the countershaft 165. As will be described in greater detail below, the support collar 256 allows connection of the reverse drive gear 246 to an actuator.

Furthermore, in the second configuration of the snowmobile 100, the gearbox 170 includes a reverse driven gear 248 mounted to the secondary shaft 174 at the configurable portion 212 of the secondary shaft 174. More specifically, as shown in FIG. 15, the reverse driven gear 248 is mounted to the secondary shaft 174 via a needle bearing 257. However, an adapter 251 mounted to the secondary shaft 274 is splined to engage the splines of the secondary shaft 174 and is drivingly connected to the reverse driven gear 248 via dog teeth 255 extending from a left side of the adapter 251. In particular, the reverse driven gear 248 has dog teeth 253 extending from a right side thereof and which match the dog teeth 255 of the adapter 251. The reverse driven gear 248 is configured to mesh with the reverse drive gear 246. The reverse driven gear 248 is enclosed within the housing 176.

In this embodiment, the reverse drive gear 246 and the reverse driven gear 248 are spur gears.

In the second configuration of the snowmobile 100, an actuator 260 is provided for selectively transmitting rotary motion from the countershaft 165 to the gearbox 170 via a selected one of the forward drive gear 184 and the reverse drive gear 246. That is, the actuator 260 is controlled by an input from the user to drive the gearbox 170 in a forward rotation direction (corresponding to rotational engagement of the forward drive gear 184) or in a reverse rotation direction (corresponding to rotational engagement of the reverse driven gear 248). To that end, in the second configuration, the reverse function control element 150 controls the actuator 260 rather than reverse operation of the engine as is the case in the first configuration. In particular, in the second configuration of the snowmobile 100, the control element 150 is selectively actuated by the user to set the actuator 260 to transmit rotary motion from the countershaft 165 to the gearbox 170 via one of the forward drive gear 184 and the reverse drive gear 246.

In this embodiment, the actuator 260 is an electric actuator. In particular, the electric actuator 260 comprises a motor 264 and a linkage assembly 266 which operatively connects the motor 264 to the reverse drive gear 246 via the support collar 256. Notably, as shown in FIGS. 11 and 12, the linkage assembly 266 includes a fork 263 having connecting arms 267 which are pivotably connected to the support collar 256. The linkage assembly 266 is configured such that rotational motion of the motor 264 causes the support collar 256 to slide along the countershaft 266. More specifically, with reference to FIGS. 10 to 12 and 15, the linkage assembly 266 includes a driving lever 269 (FIGS. 10 to 12) which is connected to a driving shaft of the motor 264 such as to rotate therewith. The driving lever 269 is fastened to a generally vertically-extending linkage 271, which in turn is fastened to a generally laterally-extending linkage 273. The laterally-extending linkage 273 is fastened to a generally longitudinally-extending linkage 274 which is connected to the fork 263. The rotating motion of the driving lever 269 causes the linkages 271, 273, 274 to move such that the driving support collar 256 is moved along the countershaft 266.

It is contemplated that, in other embodiments, the actuator 260 could be a manually operated actuator, whereby the user manually operates the actuator 260 (e.g., via a handle) to selectively transmit rotary motion to the gearbox 170 via the forward drive gear 184 or the reverse drive gear 248. For instance, in such embodiments, the actuator 260 may even be incorporated by the shifter 200 whereby the shifter 200 is used to change the gear in which the gearbox 170 operates (i.e., high, low, neutral gears) as well as to selectively place the gearbox 170 in reverse operation. For example, the shifter knob 220 could have a "reverse gear position" which, when engaged, causes the transmission of rotary motion to the gearbox 170 via the reverse drive gear 248.

The actuator 260 is controlled by the user via the control element 150 to operate the gearbox 170 in either a "forward operation mode" or a "reverse operation mode". In the forward operation mode, illustrated in FIG. 14, rotary motion is transmitted from the countershaft 165 to the gearbox 170 via the forward drive gear 184 (i.e., the forward drive gear 184 is in rotational engagement with the forward driven gear 190). More particularly, when the control element 150 is controlled by the user to engage the forward operation mode of the gearbox 170, the actuator 260 moves the reverse drive gear 246 along the countershaft 165 such that the dog teeth 252, 254 of the reverse and forward drive gears 246, 184 are engaged with one another thereby transmitting rotary motion from the reverse drive gear 246 to the forward drive gear 184 which, as it is meshed with the forward driven gear 190, drives the primary shaft 174. The manner in which motion is then transmitted to the driveshaft 175 (if the gearbox 170 is in the high or low gears) has been described above and thus will not be repeated here.

The forward operation mode is associated with a forward driving direction of the snowmobile 100 when the handlebar 126 is oriented to steer the skis 116 straight. Notably, in the forward operation mode of the gearbox 170, the driveshaft 175, when rotating (i.e., in the high gear and low gear of the gearbox 170), rotates in the same direction as the countershaft 165. Moreover, the gearbox 170 is operable in any of the high gear, the low gear and the neutral gear in the forward operation mode of the gearbox 170.

In the reverse operation mode, illustrated in FIGS. 12 and 13, rotary motion is transmitted from the countershaft 165 to the gearbox 170 via the reverse drive gear 246 (i.e., with the reverse drive gear 246 driving the reverse driven gear 248). More particularly, when the control element 150 is controlled by the user to engage the reverse operation mode of the gearbox 170, the actuator 260 moves the reverse drive gear 246 along the countershaft 165 such that the reverse drive gear 246 is aligned with and is in rotational engagement with the reverse driven gear 248 thereby transmitting rotary motion from the reverse drive gear 246 to the reverse driven gear 248. As the reverse driven gear 248 is drivingly engaged to the secondary shaft 174, it is the secondary shaft 174 that is coupled to the countershaft 165 in the reverse operation mode of the gearbox 170 rather than the primary shaft 172 (as is the case in the forward operation mode). The driving sprocket 204, which is also mounted to the secondary shaft 174, thus rotates and drives the output sprocket 208 via the flexible driving member 206. Thus, in the reverse operation mode, the selected one of the high, low and neutral gears of the gearbox 170 as set by the shifter 200 does not affect the rotational output at the driveshaft 175 since rotary motion is not transmitted from the primary shaft 172 to the secondary shaft 174.

The reverse operation mode is associated with a rearward driving direction of the snowmobile 100 when the handlebar 126 is oriented to steer the skis 116 straight. Notably, in the reverse operation mode of the gearbox 170, the driveshaft 175, when rotating (which is at all times during the reverse operation mode), rotates in a reverse direction opposite to a direction of rotation of the countershaft 165.

As will be understood, the snowmobile 100 can be provided in the first configuration or the second configuration with relative ease as most of the components are similar in both configurations. This may thus provide a drivetrain platform for a snowmobile that can accommodate an engine having an electronic reverse function (i.e., a two-stroke engine) as well as an engine which is not operable in reverse (e.g., a two-stroke or four-stroke engine) while using many of the same components. In turn, this may facilitate manufacturing of snowmobiles of both configurations as fewer parts are needed to produce different models of the snowmobile and thus decrease associated costs.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A snowmobile, comprising:
   a frame;
   at least one ski connected to the frame;
   a rear suspension assembly connected to the frame;
   a drive track disposed around the rear suspension assembly;
   an internal combustion engine supported by the frame, the engine comprising a crankshaft;
   a continuously variable transmission (CVT) operatively connected to the crankshaft, comprising:
      a drive pulley operatively connected to the crankshaft;
      a driven pulley; and
      a transmission belt interconnecting the drive pulley and the driven pulley;
   a countershaft connected to the driven pulley of the CVT;

a forward drive gear mounted to the countershaft;
a gearbox comprising:
  a first shaft;
  a second shaft extending parallel to the first shaft;
  a plurality of gears mounted to the first shaft, including:
    a plurality of first transmission gears; and
    a driven gear engaging the forward drive gear;
  a plurality of second transmission gears mounted to the second shaft,
  each of the first transmission gears being in constant mesh with a corresponding one of the second transmission gears to form a plurality of gear pairings including a high gear pairing and a low gear pairing,
  for each of the high and low gear pairings:
    a given one of the first and second transmission gears being in selective free-spin engagement with a corresponding one of the first shaft and the second shaft to which the given one of the first and second transmission gears is mounted,
    an other one of the first and second transmission gears being in fixed engagement with a corresponding one of the first shaft and the second shaft to which the other one of the first and second transmission gears is mounted; and
  a housing enclosing the first and second transmission gears therein and rotatably supporting the first shaft and the second shaft, the countershaft partly extending within the housing and rotatably supported thereby,
  a configurable portion of the countershaft extending laterally between the forward drive gear and an inner wall of the housing,
  a configurable portion of the second shaft being laterally aligned with the configurable portion of the countershaft;
a driveshaft coupled to the second shaft of the gearbox, the driveshaft being operatively connected to the drive track to propel the snowmobile; and
a shifter operable by a user for selectively operating the gearbox in one of a high gear, a low gear and a neutral gear, such that:
  when the gearbox operates in the high gear, the shifter engages the given one of the first and second transmission gears corresponding to the high gear pairing to cause driving engagement thereof with the corresponding one of the first shaft and the second shaft;
  when the gearbox operates in the low gear, the shifter engages the given one of the first and second transmission gears corresponding to the low gear pairing to cause driving engagement thereof with the corresponding one of the first shaft and the second shaft; and
  when the gearbox operates in the neutral gear, the shifter is disengaged from the first and second transmission gears so that the given one of the first and second transmission gears of each of the high and low gear pairings remains in free-spin engagement with the corresponding one of the first shaft and the second shaft,
the snowmobile being configured according to one of a first configuration and a second configuration, wherein:
  in the first configuration:
    the forward drive gear is rotationally fixed to the countershaft;
    the driven gear is rotationally fixed to the first shaft;
    the driven gear is in rotational engagement with the forward drive gear so that the first shaft is coupled to the countershaft;
    when rotating, the driveshaft rotates in a same direction as the countershaft; and
    the configurable portions of the countershaft and the second shaft are free of gears;
  and
  in the second configuration:
    the forward drive gear is in selective free-spin engagement with the countershaft;
    the snowmobile further comprises:
      a reverse drive gear mounted to the countershaft at the configurable portion of the countershaft, the reverse drive gear being in driving engagement with the countershaft; and
      an actuator for selectively transmitting rotary motion from the countershaft to the gearbox via a selected one of the forward drive gear and the reverse drive gear;
    the gearbox further comprises a reverse driven gear mounted to the second shaft at the configurable portion of the second shaft, enclosed within the housing of the gearbox, and configured to mesh with the reverse drive gear;
    when the selected one of the forward drive gear and the reverse drive gear is the forward drive gear:
      when rotating, the driveshaft rotates in the same direction as the countershaft; and
      the gearbox is operable in one of the high gear, the low gear and the neutral gear;
    and
    when the selected one of the forward drive gear and the reverse drive gear is the reverse drive gear:
      when rotating, the driveshaft rotates in a reverse direction opposite to a direction of rotation of the countershaft.

2. The snowmobile of claim 1, wherein the gearbox further comprises:
  a driving sprocket fixedly mounted to the second shaft and enclosed within the housing of the gearbox;
  an output sprocket fixedly mounted to the driveshaft and enclosed within the housing of the gearbox; and
  a flexible driving member drivingly connecting the driving sprocket to the output sprocket so as to transmit rotary motion from the second shaft to the driveshaft.

3. The snowmobile of claim 2, wherein the flexible driving member is a chain.

4. The snowmobile of claim 1, wherein:
  the given one of the first and second transmission gears of each of the high and low gear pairings in selective free-spin engagement with the corresponding one of the first shaft and the second shaft is the first transmission gears such that:
    the first transmission gears are in selective free-spin engagement with the first shaft; and
    the second transmission gears are in fixed engagement with the second shaft.

5. The snowmobile of claim 4, wherein the shifter comprises:
  a shifter knob movable between a high gear position, a low gear position and a neutral gear position corresponding to the high gear, the low gear and the neutral gear of the gearbox respectively;
  a dog mounted on the first shaft and slidable along an axis of the first shaft, the dog comprising dog teeth; and a plurality of links interconnecting the dog to the shifter knob, wherein:

each of the first transmission gears has dog teeth matching the dog teeth of the dog;

when the shifter knob is moved to the high gear position, the dog engages the dog teeth of the first transmission gear corresponding to the high gear pairing;

when the shifter knob is moved to the low gear position, the dog engages the dog teeth of the first transmission gear corresponding to the low gear pairing; and when the shifter knob is moved to the neutral gear position, the dog is disengaged from the first transmission gears.

6. The snowmobile of claim 5, wherein, in the neutral gear position of the shifter knob, the dog is mounted on the first shaft between the first transmission gear corresponding to the high gear pairing and the first transmission gear corresponding to the low gear pairing.

7. The snowmobile of claim 1, wherein the housing of the gearbox comprises a left housing portion and a right housing portion, the left and right housing portions being affixed to one another.

8. The snowmobile of claim 1, wherein:

the first shaft defines a first shaft axis about which the first shaft is rotatable;

the second shaft defines a second shaft axis about which the second shaft is rotatable; and the first shaft axis is vertically higher than the second shaft axis.

9. The snowmobile of claim 8, wherein the driveshaft defines a driveshaft axis about which the driveshaft is rotatable, the second shaft axis being vertically higher than the driveshaft axis.

10. The snowmobile claim 1, wherein the first transmission gears and the second transmission gears are helical gears.

11. The snowmobile of claim 1, wherein the low gear pairing is disposed laterally between the high gear pairing and the CVT.

12. The snowmobile claim 1, wherein the low gear pairing is disposed laterally between the forward drive gear and the high gear pairing.

13. The snowmobile of claim 1, wherein the low gear pairing is disposed laterally between the high gear pairing and the driven gear.

14. The snowmobile of claim 13, wherein the driven gear is disposed leftwardly of the low gear pairing.

15. The snowmobile of claim 2, wherein the driving sprocket is disposed laterally between the low gear pairing and the CVT.

16. The snowmobile of claim 2, wherein the low gear pairing is disposed laterally between the high gear pairing and the driving sprocket.

17. The snowmobile of claim 1, wherein, in the second configuration:

the actuator is operatively connected to the reverse drive gear;

the reverse drive gear has dog teeth extending from a lateral side thereof;

the forward drive gear has dog teeth configured for matching the dog teeth of the reverse drive gear, the dog teeth of the forward drive gear extending from a lateral side thereof; and when the selected one of the forward drive gear and the reverse drive gear is the forward drive gear, the actuator moves the reverse drive gear along the countershaft such that the dog teeth of the forward and reverse drive gears are engaged with one another thereby transmitting rotary motion from the reverse drive gear to the forward drive gear.

18. The snowmobile of claim 17, wherein, in the second configuration:

when the selected one of the forward drive gear and the reverse drive gear is the reverse drive gear, the actuator moves the reverse drive gear along the countershaft such that the reverse drive gear is in rotational engagement with the reverse driven gear thereby transmitting rotary motion from the reverse drive gear to the reverse driven gear.

19. The snowmobile of claim 1, wherein, in the first configuration, the forward drive gear is a single gear mounted to the countershaft to drive the gearbox.

20. The snowmobile of claim 1, wherein the actuator is an electric actuator.

* * * * *